United States Patent
Heo et al.

(10) Patent No.: US 11,930,166 B2
(45) Date of Patent: *Mar. 12, 2024

(54) METHOD AND DEVICE FOR PROCESSING VIDEO SIGNAL FOR INTRA PREDICTION

(71) Applicant: LG ELECTRONICS INC., Seoul (KR)

(72) Inventors: Jin Heo, Seoul (KR); Sunmi Yoo, Seoul (KR); Ling Li, Seoul (KR); Jangwon Choi, Seoul (KR); Jungah Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 42 days.

This patent is subject to a terminal disclaimer.

(21) Appl. No.: 17/871,727

(22) Filed: Jul. 22, 2022

(65) Prior Publication Data
US 2022/0368895 A1 Nov. 17, 2022

Related U.S. Application Data

(63) Continuation of application No. 17/406,528, filed on Aug. 19, 2021, now Pat. No. 11,431,969, which is a
(Continued)

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11);
(Continued)

(58) Field of Classification Search
CPC .... H04N 19/11; H04N 19/105; H04N 19/119; H04N 19/176; H04N 19/46; H04N 19/593; H04N 19/70; H04N 19/132
See application file for complete search history.

(56) References Cited

U.S. PATENT DOCUMENTS

2018/0332284 A1* 11/2018 Liu ................. H04N 19/139
2019/0028729 A1    1/2019 Boon
(Continued)

FOREIGN PATENT DOCUMENTS

KR   10-2019-0013611 A    2/2019

OTHER PUBLICATIONS

Bross, Benjamin et al., Versatile Video Coding (Draft 4). JVET-M1001-v3. Joint Video Experts Team (JVET) of ITU-T SG 16 WP 3 and ISO/IEC JTC 1/SC 29/WG 11. 13th Meeting: Marrakech, MA. Feb. 19, 2019, pp. 1-242.
(Continued)

*Primary Examiner* — Francis Geroleo
(74) *Attorney, Agent, or Firm* — Bryan Cave Leighton Paisner LLP

(57) ABSTRACT

Embodiments of the present specification provide a method and a device for processing a video signal for intra prediction. A method for decoding a video signal according an embodiment of the present disclosure includes: obtaining intra prediction information of a current block to which the intra prediction is applied, in which the intra prediction information includes a first flag indicating a predetermined first mode; determining an intra prediction mode of the current block based on the intra prediction information, wherein when the first flag corresponds to a first value, the first mode is determined as the intra prediction mode and when the first flag corresponds to a second value, one of a plurality of candidate modes is determined as the intra prediction mode; and generating a prediction sample of the current block based on the intra prediction mode and a reference sample in a current picture. A separate flag indicating whether to use a primarily used specific mode is used to reduce a data amount for transmission of the intra
(Continued)

prediction mode and a processing time of information of the intra prediction.

8 Claims, 28 Drawing Sheets

Related U.S. Application Data continuation of application No. PCT/KR2020/002568, filed on Feb. 21, 2020.

(60) Provisional application No. 62/808,835, filed on Feb. 21, 2019.

(51) Int. Cl.
*H04N 19/119* (2014.01)
*H04N 19/176* (2014.01)
*H04N 19/46* (2014.01)
*H04N 19/593* (2014.01)

(52) U.S. Cl.
CPC ........... *H04N 19/176* (2014.11); *H04N 19/46* (2014.11); *H04N 19/593* (2014.11)

(56) References Cited

U.S. PATENT DOCUMENTS

| | | | | |
|---|---|---|---|---|
| 2019/0306494 | A1* | 10/2019 | Chang | H04N 19/11 |
| 2020/0195920 | A1* | 6/2020 | Racape | H04N 19/91 |
| 2020/0252608 | A1* | 8/2020 | Ramasubramonian | H04N 19/96 |
| 2020/0260114 | A1* | 8/2020 | Zhao | H04N 19/184 |
| 2021/0176493 | A1* | 6/2021 | Wang | H04N 19/159 |

OTHER PUBLICATIONS

Bossen, F. et al., Non-CE3: A unified luma intra mode list construction process. JVET-M0528_r1. Joint Video Experts Team (JVET) of ITU-T SO 16 WP 3 and ISO/IEC JTC 1/SC 29AVG 11. 13th Meeting: Marrakech, MA. Jan. 11, 2019, pp. 1-4.
De-Luxan-Hernandez, Santiago et al., CE3: Intra Sub-Partitions Coding Mode (Tests 1.1.1 and 1.1.2). JVET-M0102-v5. Joint Video Experts Team (JVET) of ITU-T SG 16 WP 3 and ISO/IEC JTC 1/SC 29/WG 11. 13th Meeting: Marrakech, MA. Jan. 17, 2019, pp. 1-9.
T. Kumakura et al., "Fixing the No. of mpm candidates", Joint Collaborative Team on Video Coding (JCT-VC) of ITU-T SG16 WP3 and ISO/IEC JTC1/SC29/WG11, Jul. 14-22, 2011, JCTVC-F340.

* cited by examiner

[FIG. 1]
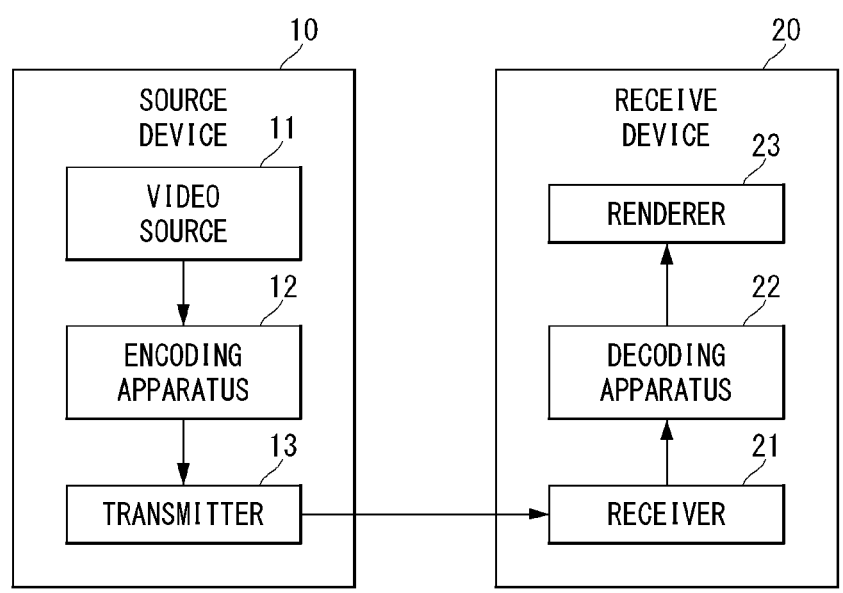

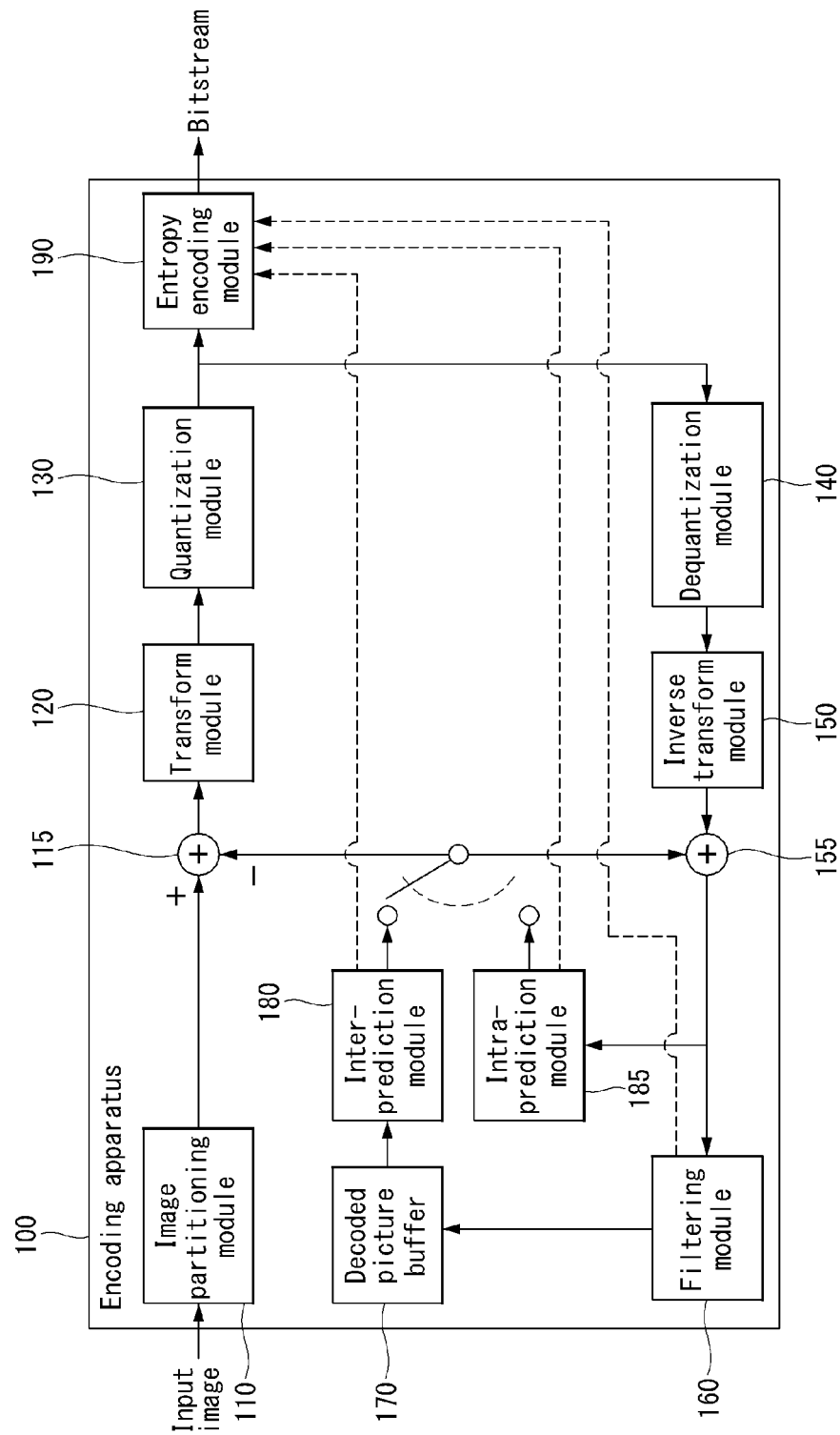
[ FIG. 2 ]

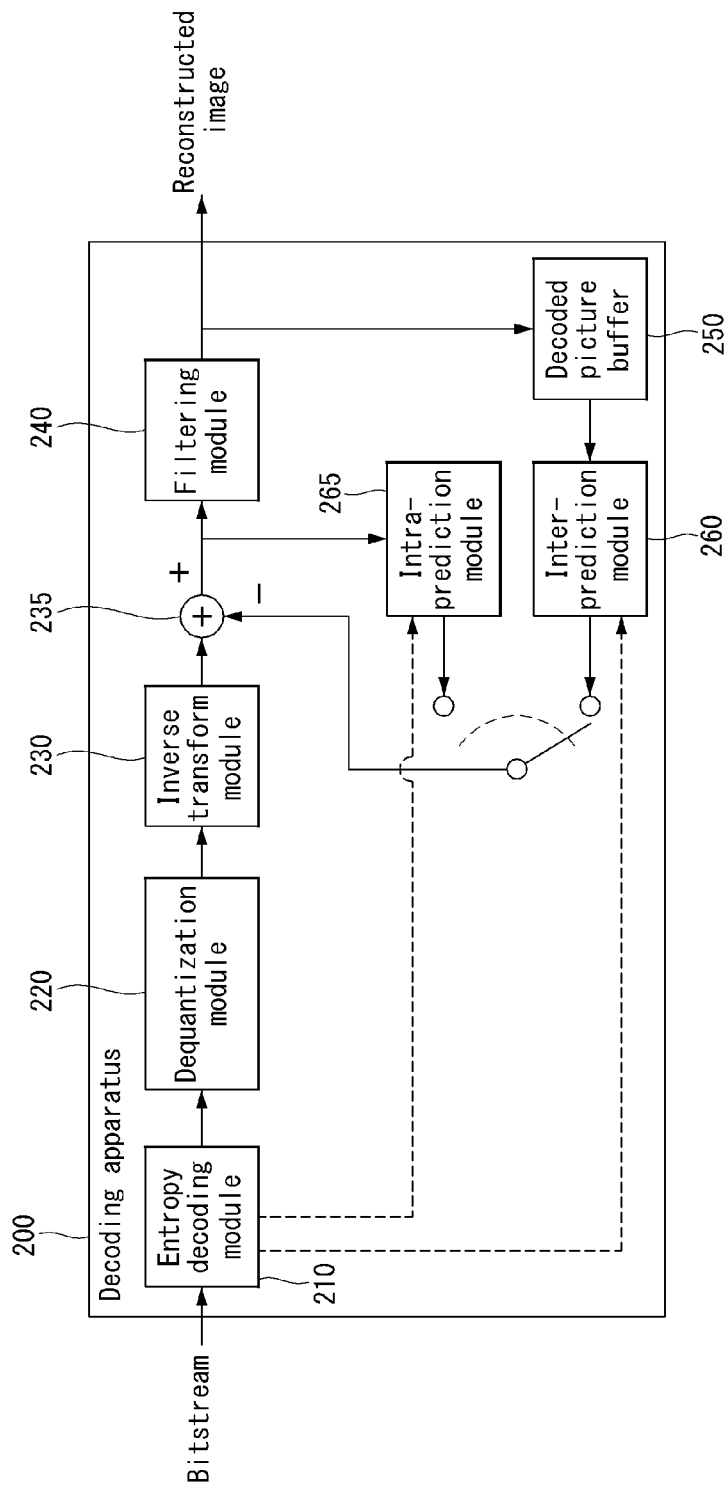
[ FIG. 3 ]

[FIG. 4]
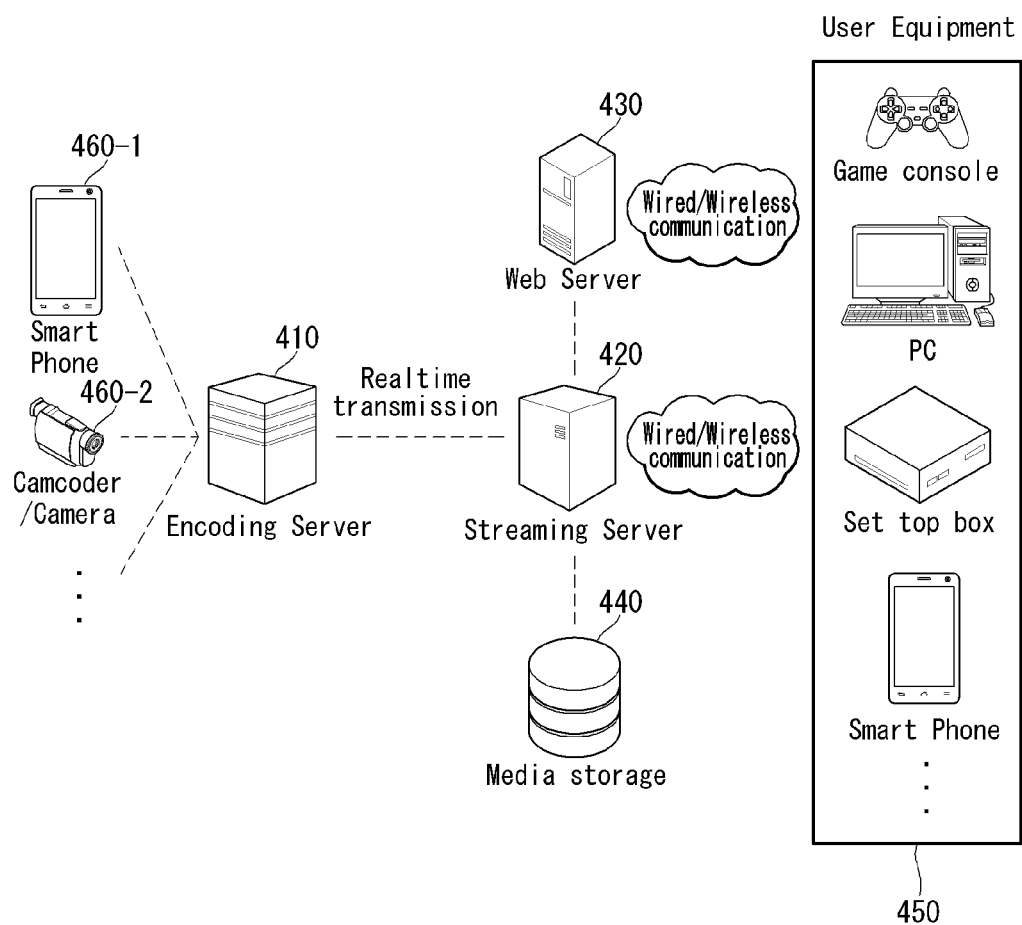

[FIG. 5]
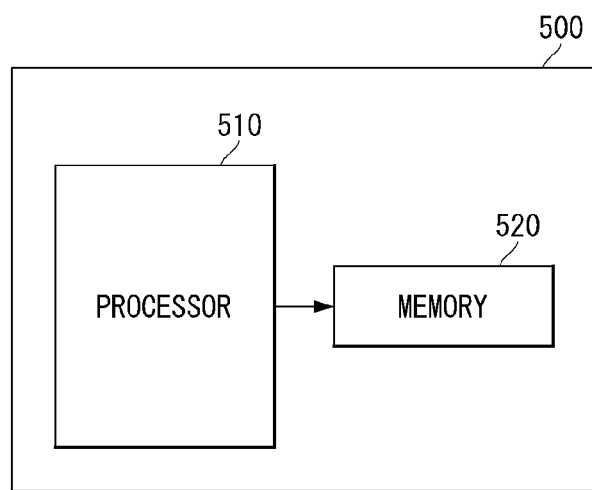

【FIG. 6a】
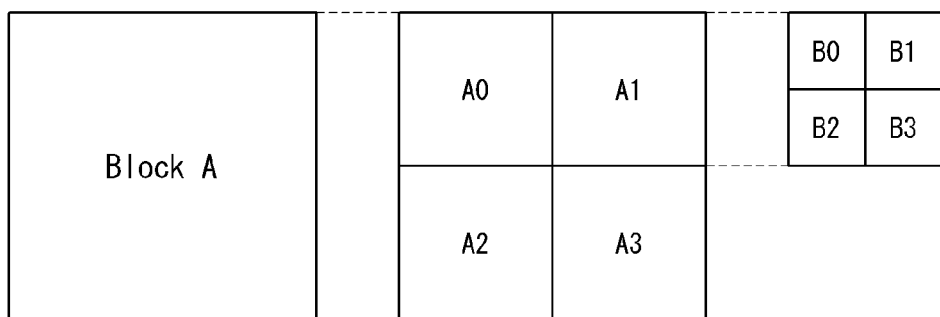
【FIG. 6b】
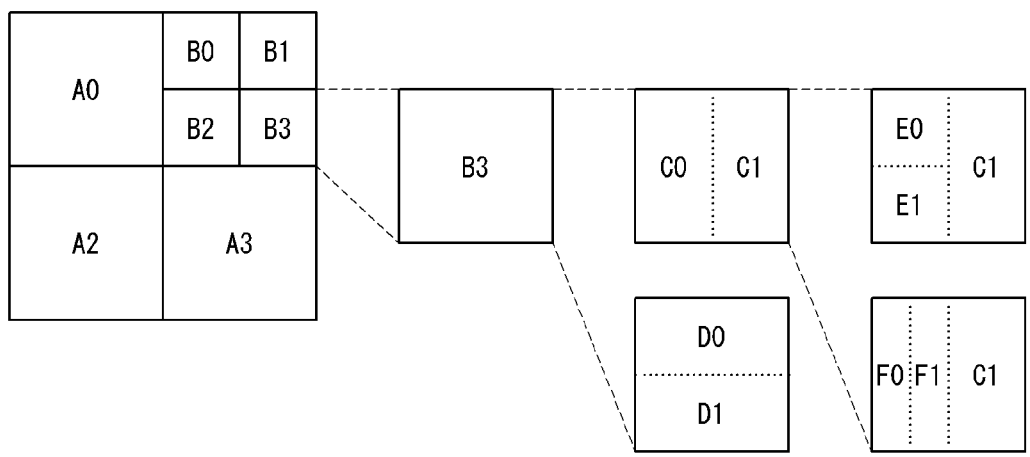

【FIG. 6c】
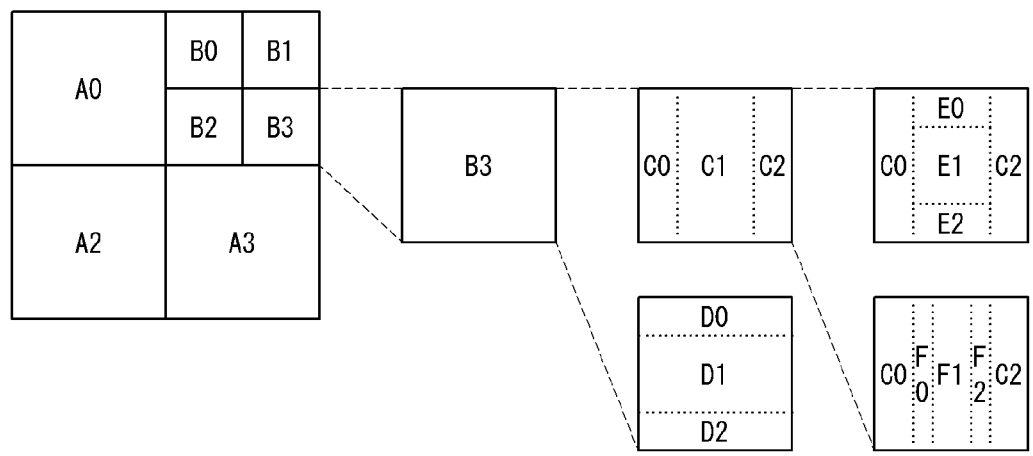
【FIG. 6d】
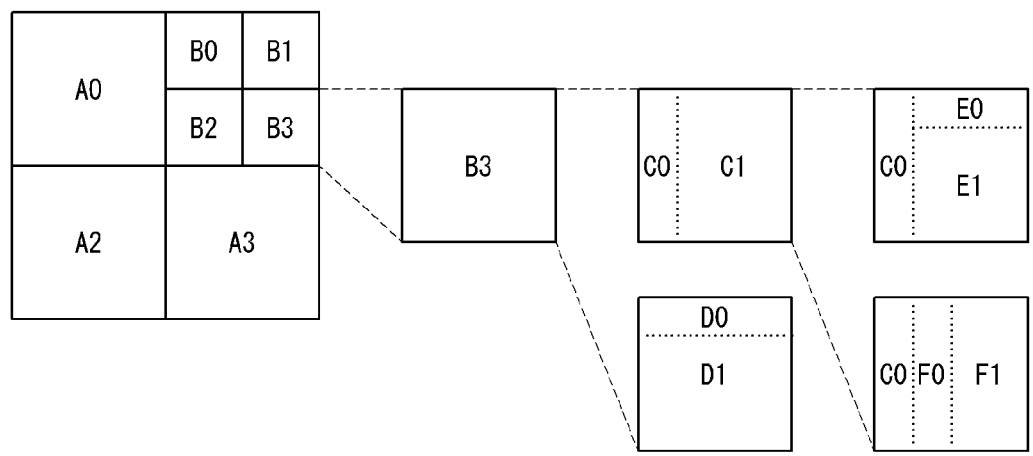

[FIG. 7]
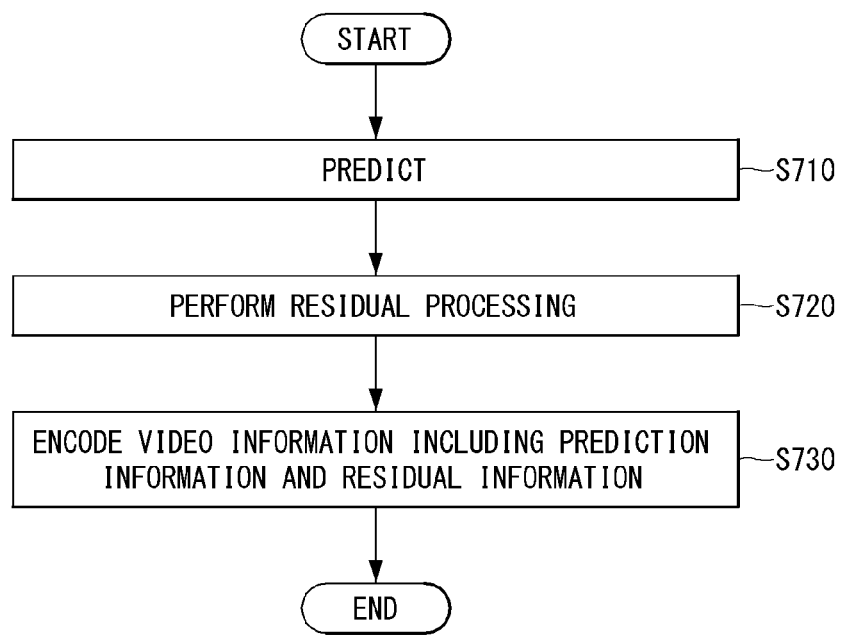

[FIG. 8]
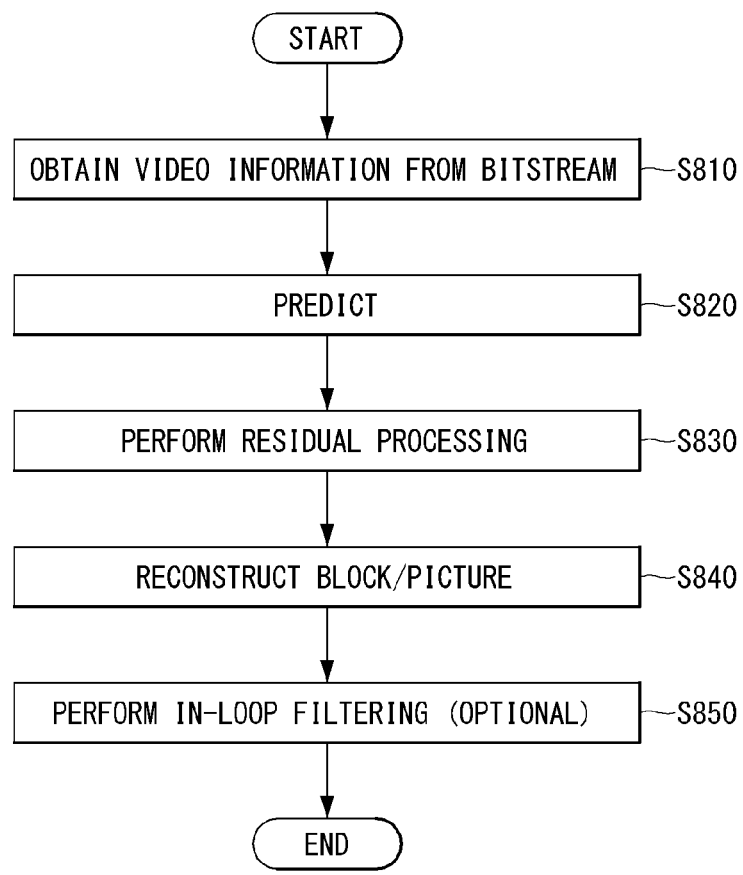

[FIG. 9]
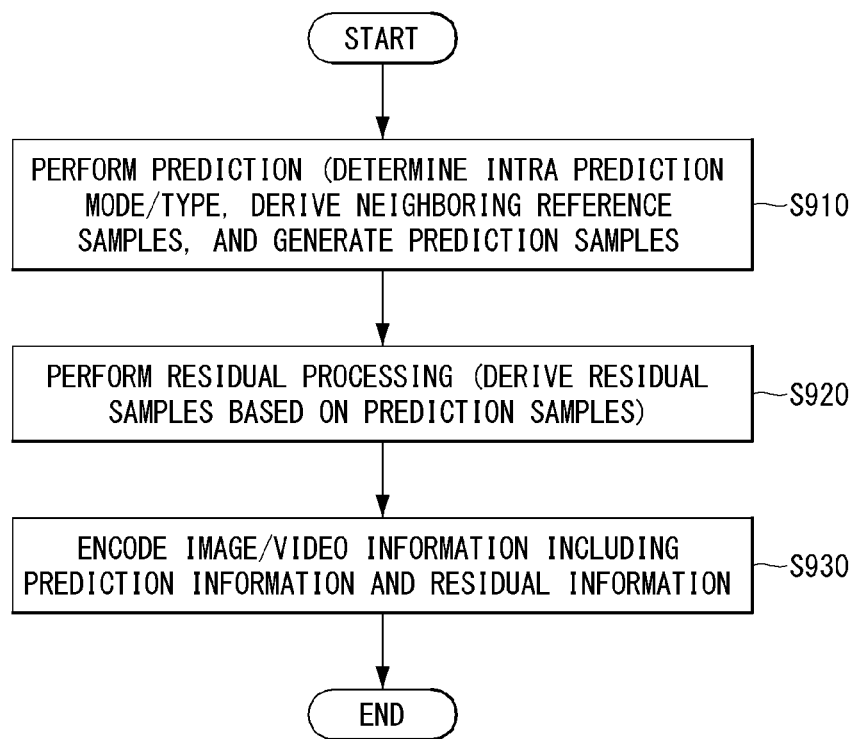

[FIG. 10]
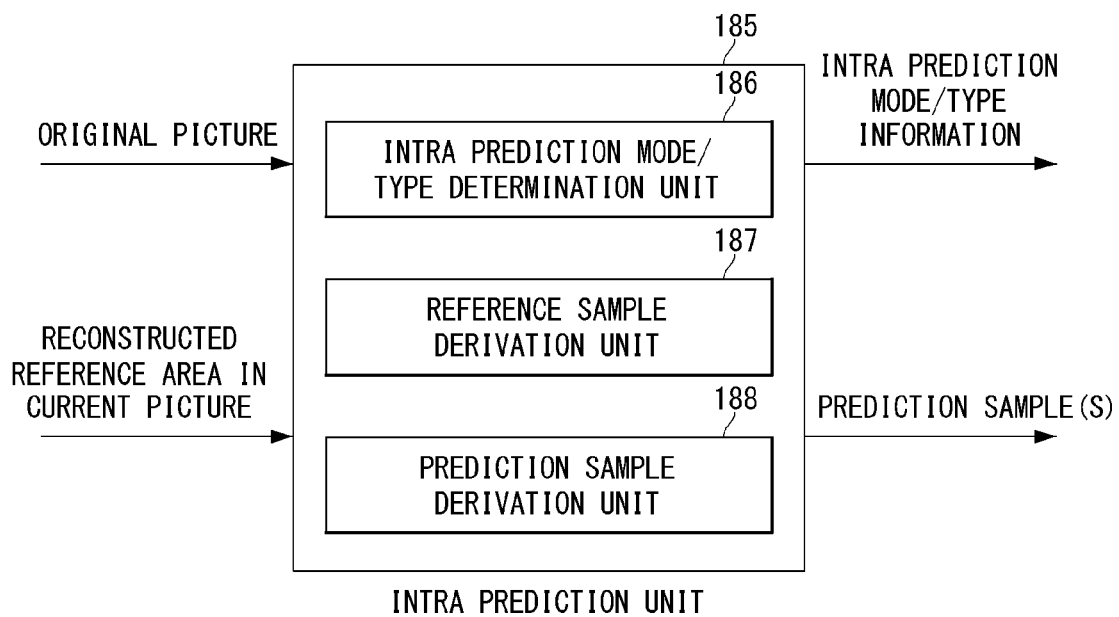

[FIG. 11]
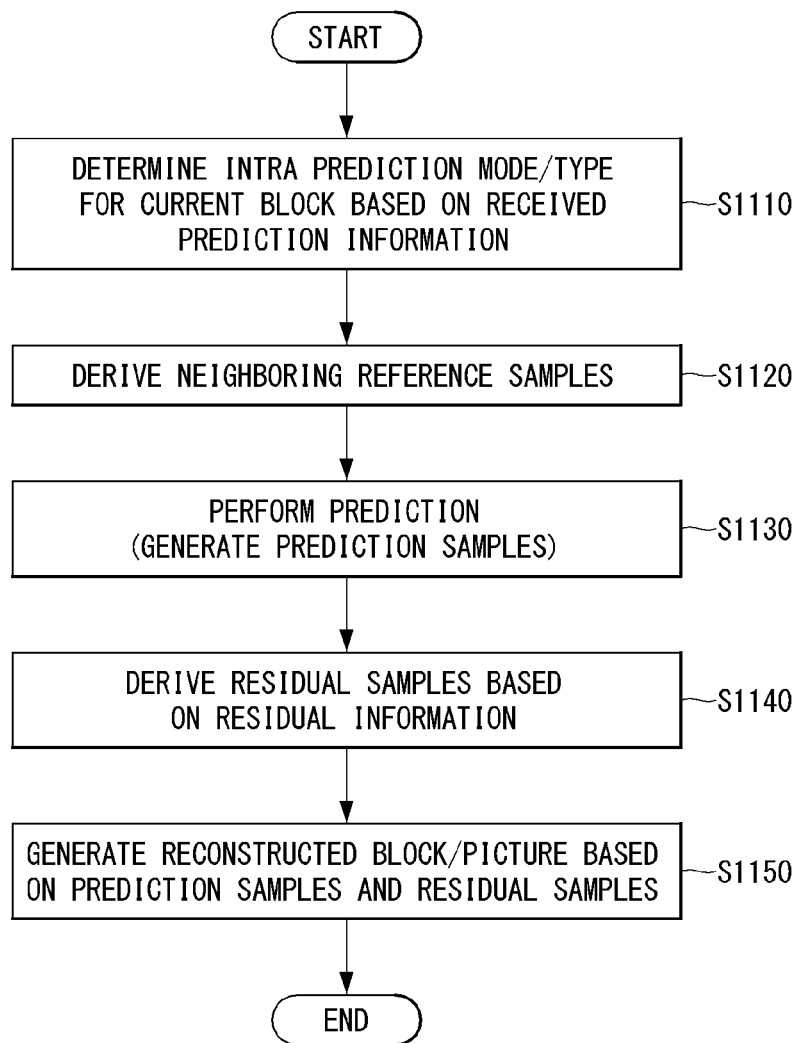

[FIG. 12]
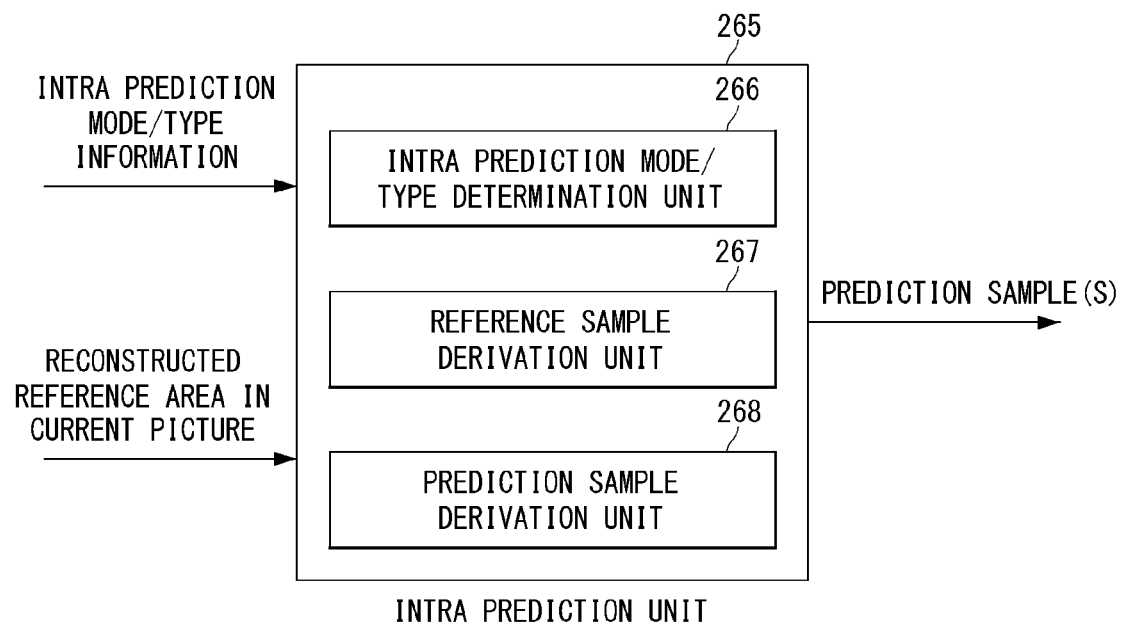

[FIG. 13]
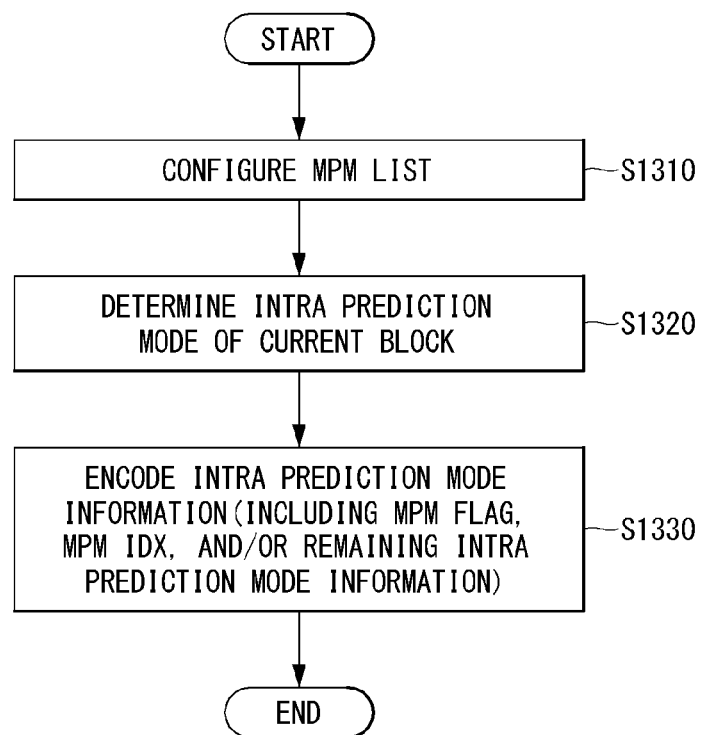

[FIG. 14]
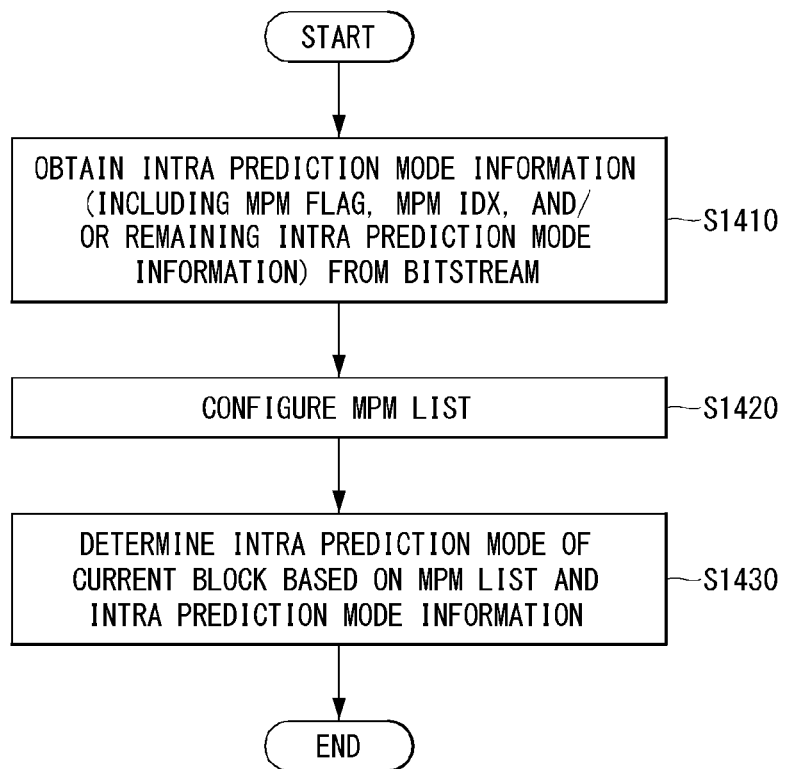

[FIG. 15]
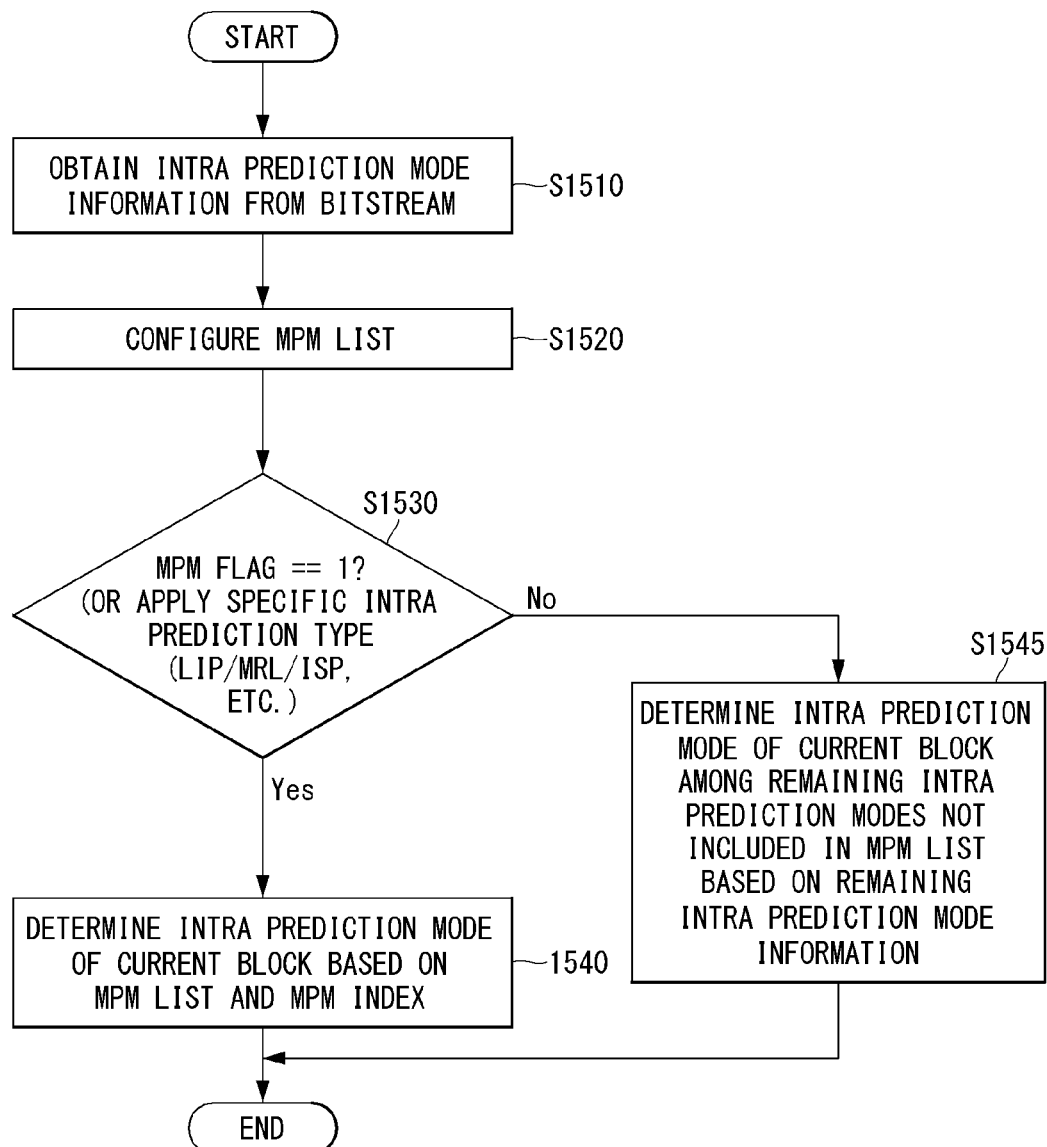

[FIG. 16]
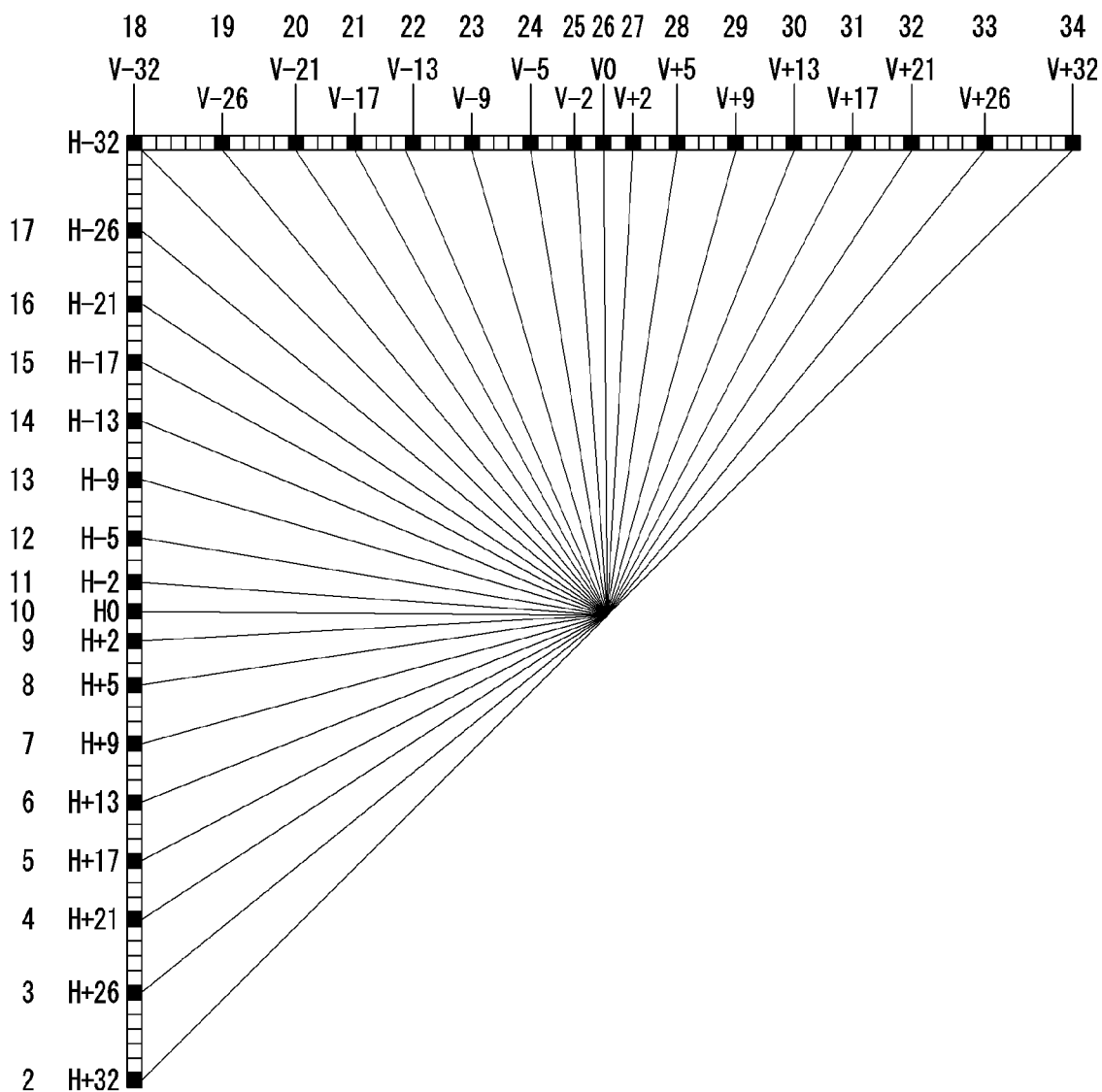

【FIG. 17】
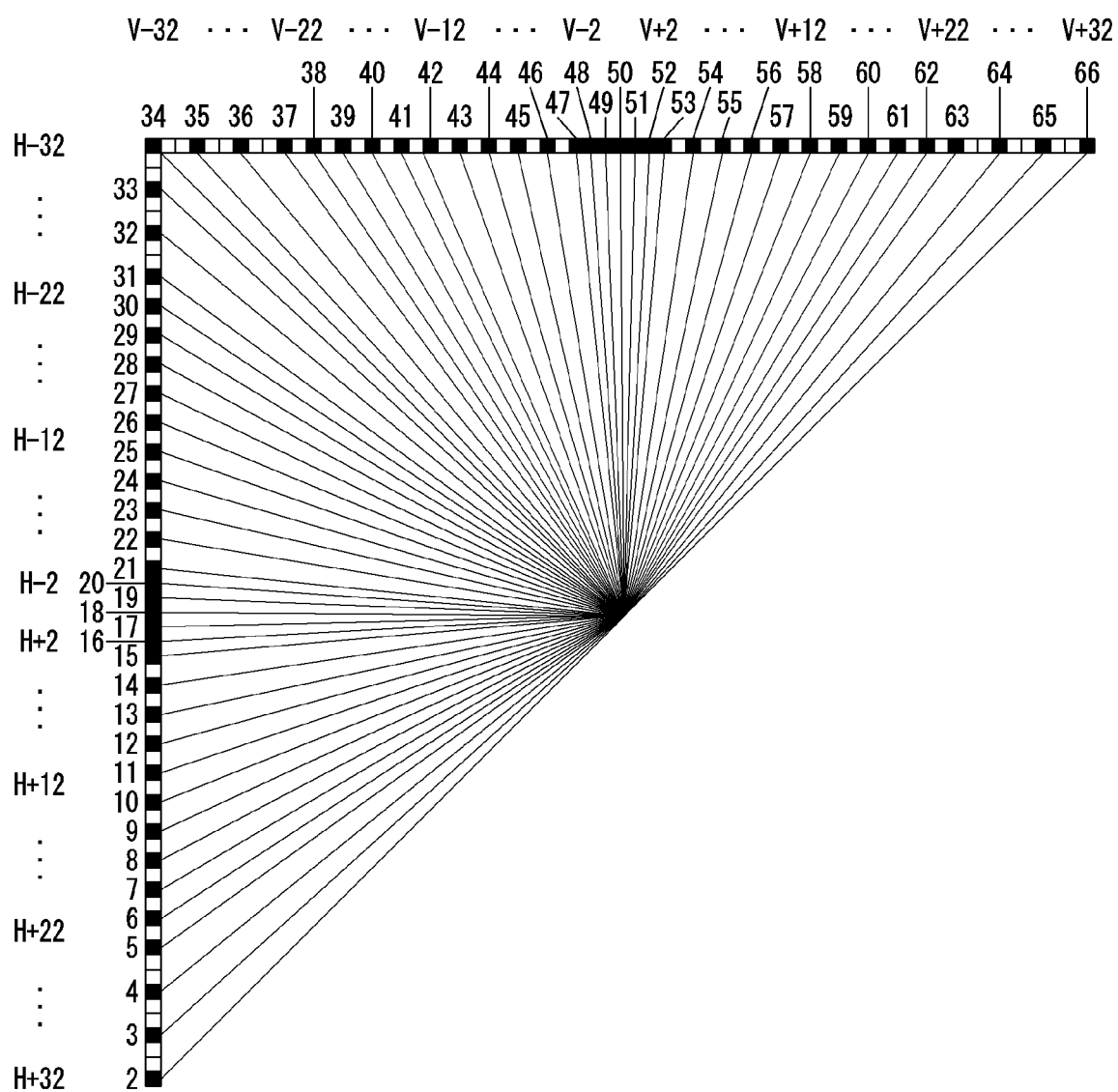

[ FIG. 18 ]
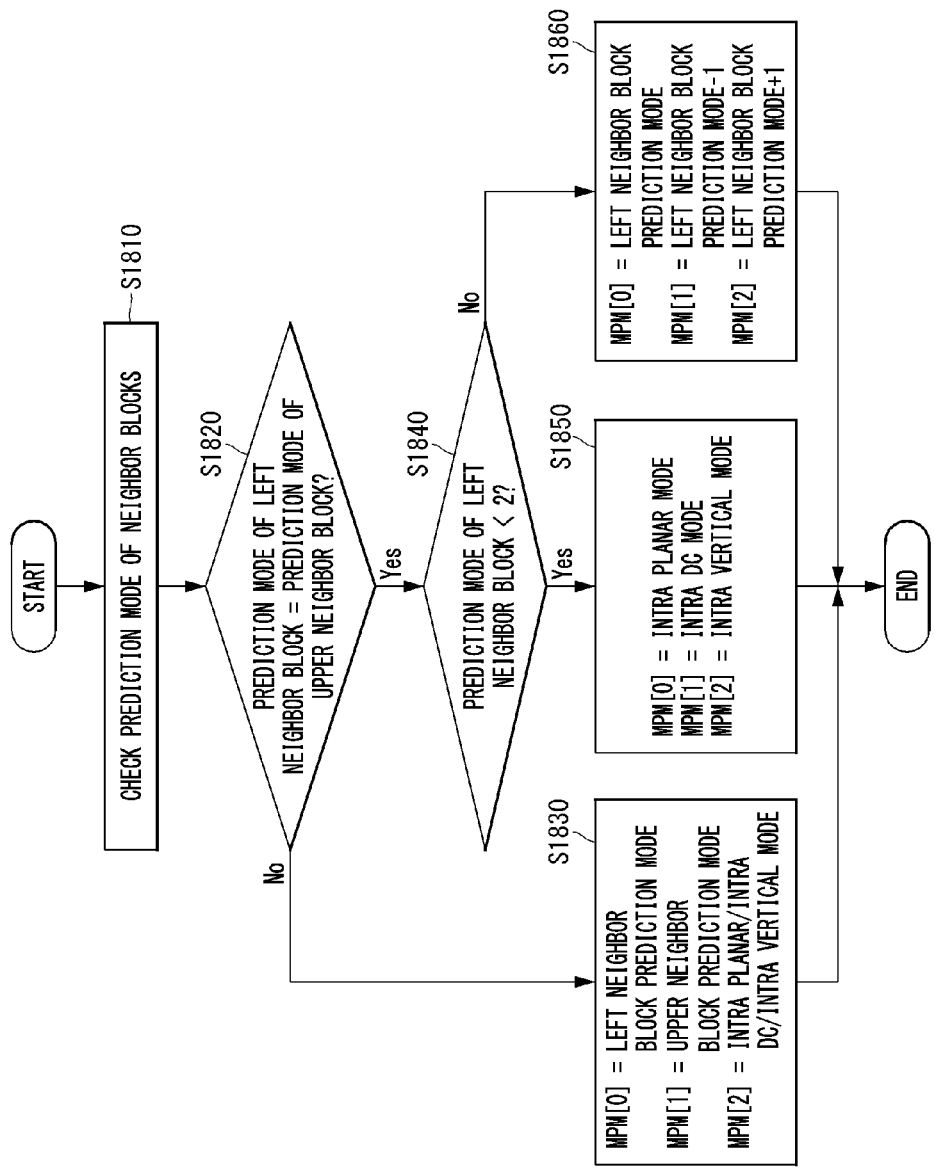

[FIG. 19]
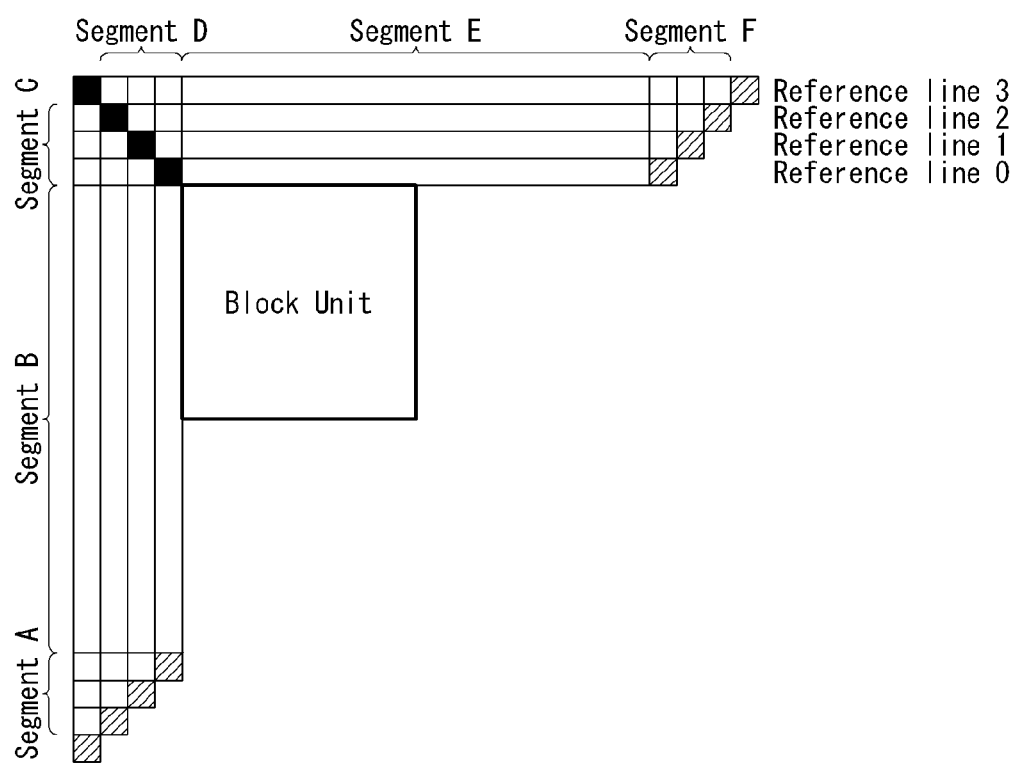

[FIG. 20a]
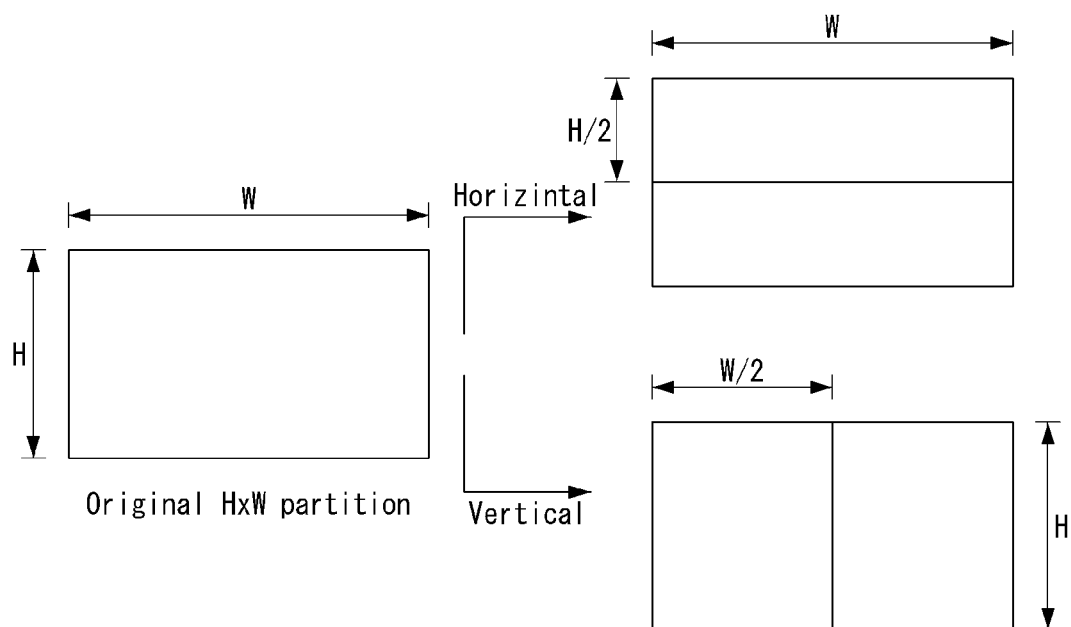

[FIG. 20b]
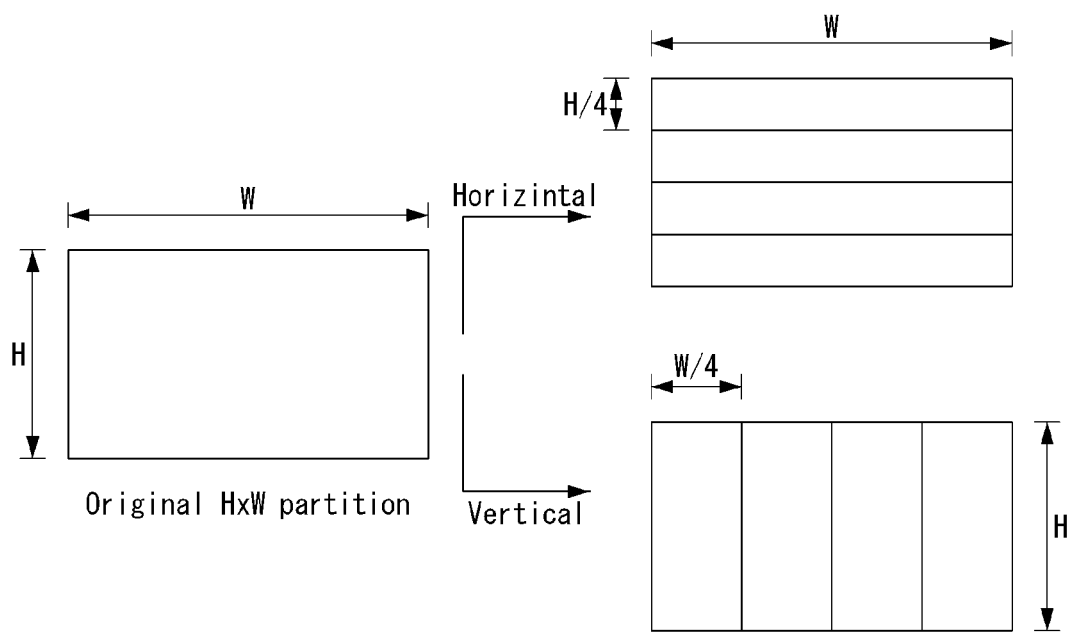

[FIG. 21]
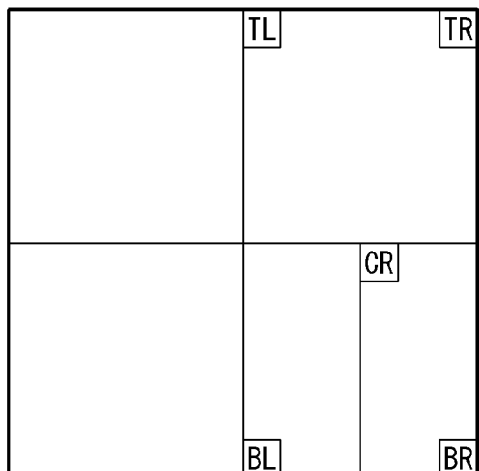
luma block
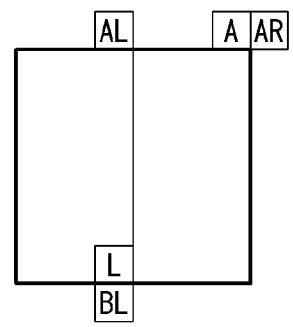
chroma block
[FIG. 22]
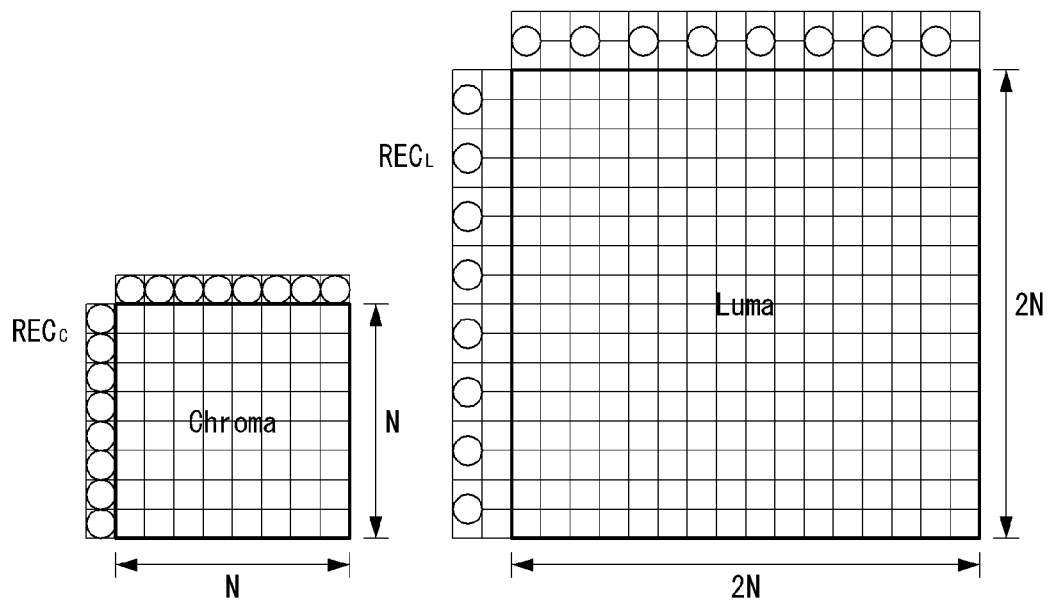

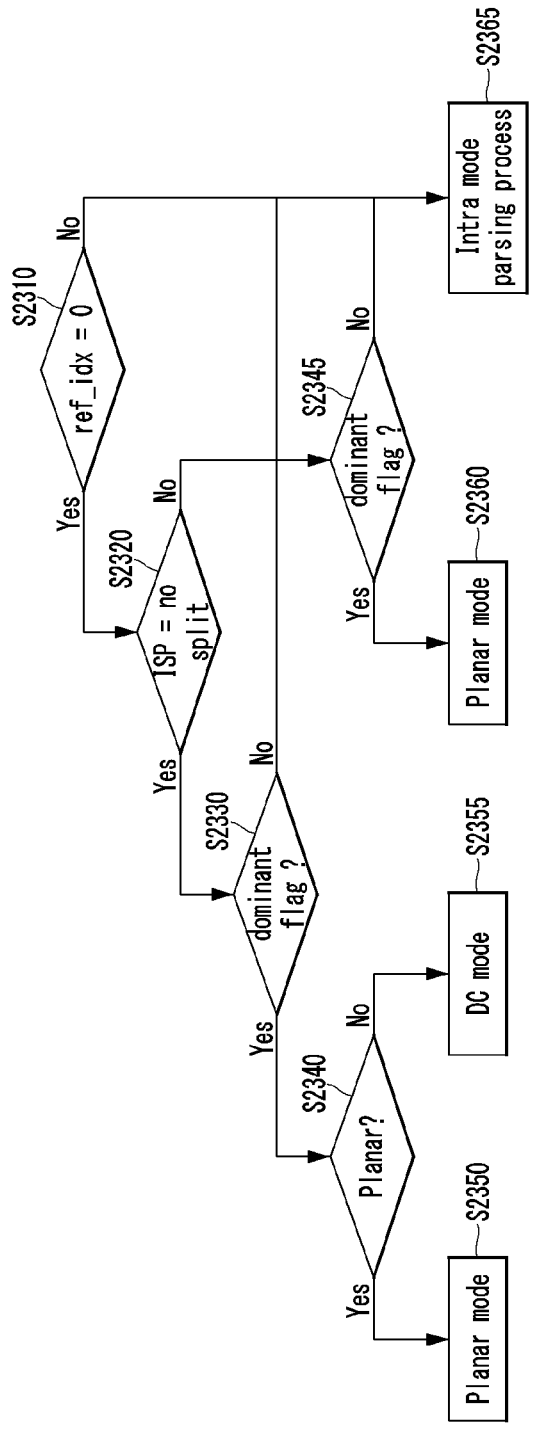
[ FIG. 23 ]

[FIG. 24]

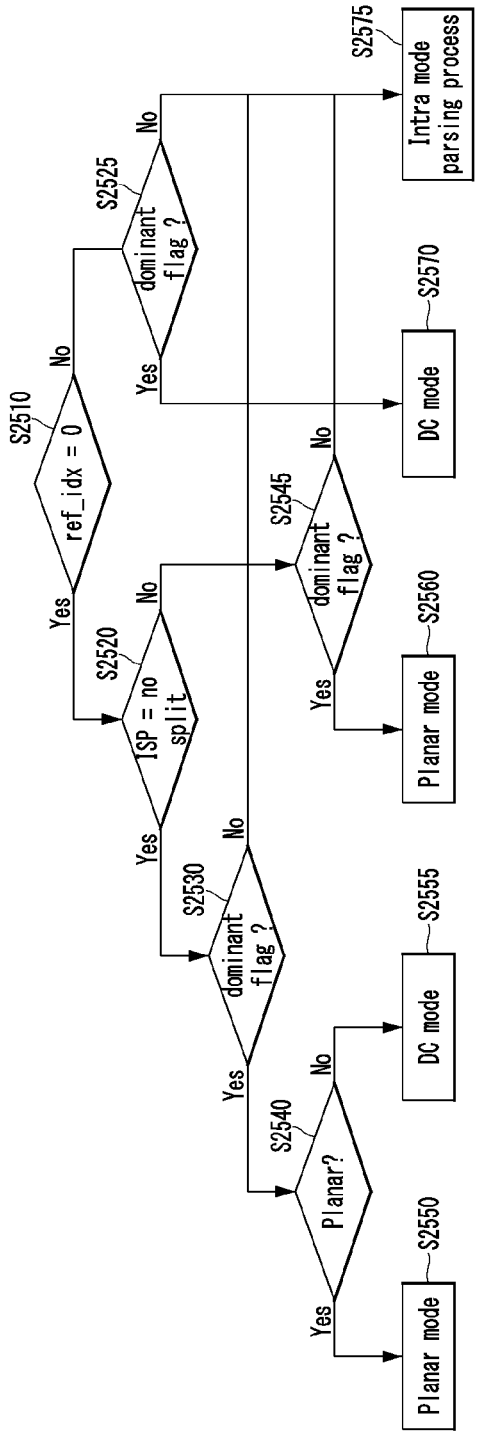
[ FIG. 25 ]

[FIG. 26]
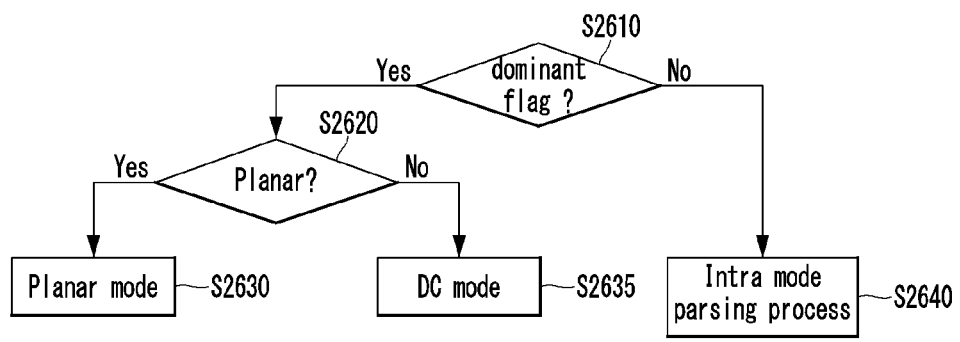
[FIG. 27]
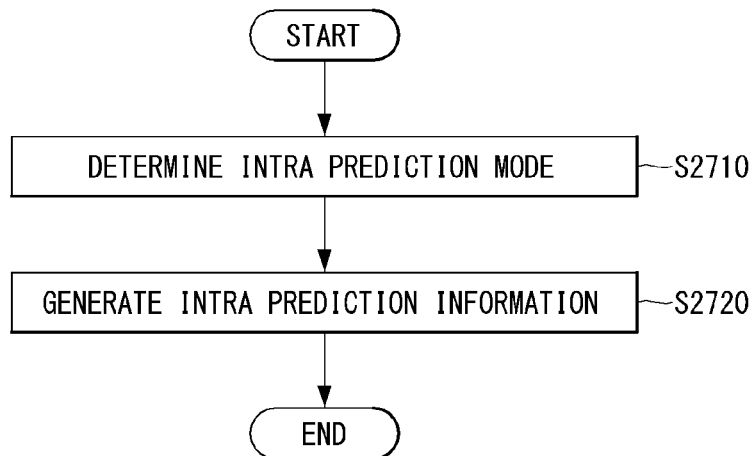

[FIG. 28]
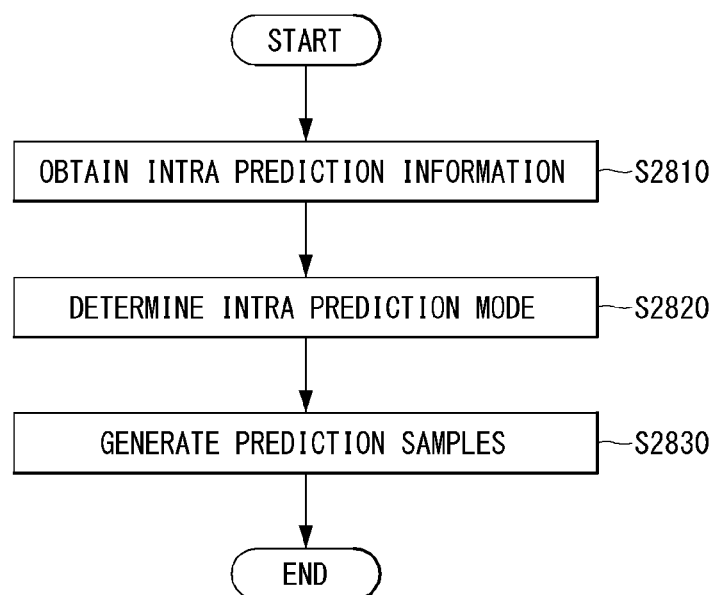

METHOD AND DEVICE FOR PROCESSING VIDEO SIGNAL FOR INTRA PREDICTION

This application is a continuation application of U.S. patent application Ser. No. 17/406,528, filed on Aug. 19, 2021 which is a continuation of PCT of International Application No. PCT/KR2020/002568, filed on Feb. 21, 2020, which claims priority to U.S. Provisional Application No. 62/808,835, filed on Feb. 21, 2019, all of which are incorporated by reference, as if fully set forth herein.

TECHNICAL FIELD

An embodiment of the present disclosure relates to a video/image compression coding system, and more particularly, to a method and a device for performing intra prediction in an encoding/decoding process of a video signal.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Intra prediction is a method for performing prediction by referring to neighboring reconstructed samples of a current block to be encoded/decoded in a current picture. In order to increase efficiency of the intra prediction, addition/extension of an intra prediction mode is being discussed together with a new intra prediction method.

DISCLOSURE

Technical Problem

An embodiment of the present disclosure provides a method and a device for reducing a data amount required for encoding/decoding an intra prediction mode in the process of encoding/decoding information for intra prediction.

Technical objects to be achieved in embodiments of the present disclosure are not limited to the aforementioned technical objects, and other technical objects not described above may be evidently understood by a person having ordinary knowledge in the art to which the present disclosure pertains from the following description.

Technical Solution

Embodiments of the present disclosure provide a method and a device for processing a video signal for intra prediction. A method for decoding a video signal according an embodiment of the present disclosure includes: obtaining intra prediction information of a current block to which the intra prediction is applied, in which the intra prediction information includes a first flag indicating a predetermined first mode; determining an intra prediction mode of the current block based on the intra prediction information, wherein when the first flag corresponds to a first value, the first mode is determined as the intra prediction mode and when the first flag corresponds to a second value, one of a plurality of candidate modes is determined as the intra prediction mode; and generating a prediction sample of the current block based on the intra prediction mode and a reference sample in a current picture.

In an embodiment, the first mode may correspond to a non-directional mode, and the non-directional mode may include at least one of a planar mode or a DC mode.

The obtaining of the intra prediction information may include obtaining a second flag indicating whether to use the planar mode, and the intra prediction mode of the current block may be determined as one of the planar mode and the DC mode based on the second flag.

In an embodiment, the second flag may be parsed when the first flag corresponds to the first value and the current block is not partitioned by intra sub-partition (ISP).

In an embodiment, when the first flag corresponds to the first value and the current block is partitioned by the intra sub-partition (ISP), the intra prediction mode may be determined as the planar mode.

In an embodiment, the obtaining of the intra prediction information may include obtaining information on a location of a reference sample for prediction of the current block, obtaining the first flag when reference samples positioned on a line adjacent to the current block are used, and obtaining prediction mode indication information when reference samples positioned spaced apart from the current block by a 2-sample distance or more are used, and the prediction mode indication information may include an MPM index indicating one of most probable mode (MPM) candidate modes or a remaining index indicating one of remaining candidates other than the first mode and the MPM candidate modes among all modes.

In an embodiment, the obtaining of the prediction mode indication information may include determining whether to use the MPM candidate modes based on an MPM flag, and obtaining the MPM index when the MPM candidate modes are used and obtaining the remaining index when the MPM candidate modes are not used.

In an embodiment, the determining of the intra prediction mode may include configuring an MPM candidate list including the MPM candidate modes when the first flag corresponds to the second value, and the MPM candidate list may be configured based on intra prediction modes other than the first mode among the all modes.

In an embodiment, the obtaining of the prediction mode indication information may include determining whether to use the MPM candidate modes based on an MPM flag, and obtaining the MPM index when the MPM candidate modes are used and obtaining the remaining index when the MPM candidate modes are not used.

In an embodiment, the determining of the intra prediction mode may include configuring an MPM candidate list including the MPM candidate modes when the first flag corresponds to the second value, and the MPM candidate list may be configured based on intra prediction modes other than the first mode among the all modes.

In an embodiment, the obtaining of the intra prediction information may include obtaining a reference index indicating the location of the reference sample for prediction of the current block, and obtaining the first flag when the reference samples positioned spaced apart from the current block by a 2-sample distance or more are used, and when the first flag corresponds to the first value, the intra prediction mode of the current block may be determined as the DC mode.

A method for decoding a video signal according to an embodiment of the present disclosure includes: determining an intra prediction mode of a current block; and generating intra prediction information based on the intra prediction mode, and the intra prediction information includes a first flag, and the first flag is coded with a first value when the intra prediction mode corresponds to the predetermined first mode and coded with a second value when the intra prediction mode corresponds to one of modes other than the first mode.

In an embodiment, the first mode may correspond to a non-directional mode, and the non-directional mode may include at least one of a planar mode or a DC mode.

In an embodiment, when the first flag corresponds to the first value, the intra prediction information may further include a second flag indicating one of the planar mode and the DC mode.

In an embodiment, the generating of the intra prediction information may include configuring a most probable mode (MPM) candidate list including MPM candidates when the intra prediction mode corresponds to one of the modes other than the first mode, wherein the MPM candidate list is configured based on intra prediction modes other than the first mode among all modes, coding an MPM index indicating one MPM candidate of the MPM candidate list as the intra prediction information when the intra prediction mode corresponds to one the MPM candidates, and coding a remaining index indicating one of remaining candidates of other than the first mode and the MPM candidates as the intra prediction information among the all modes when the intra prediction mode is not included in the MPM candidate list.

An apparatus for decoding a video signal according to an embodiment of the present disclosure includes: a memory storing the video signal; and a processor connected to the memory and processing the video signal. The processor is configured to obtain intra prediction information of a current block to which the intra prediction is applied, wherein the intra prediction information includes a first flag indicating a predetermined first mode, determine an intra prediction mode of the current block based on the intra prediction information, wherein when the first flag corresponds to a first value, the first mode is determined as the intra prediction mode and when the first flag corresponds to a second value, one of a plurality of candidate modes is determined as the intra prediction mode, and generate a prediction sample of the current block based on the intra prediction mode.

A method for encoding a video signal according to an embodiment of the present disclosure includes: a memory storing the video signal; and a processor connected to the memory and processing the video signal, and the processor is configured to determine an intra prediction mode of a current block, and generate intra prediction information based on the intra prediction mode, and the intra prediction information includes a first flag, and the first flag is coded with the first value when the intra prediction mode corresponds to the predetermined first mode and coded with the second value when the intra prediction mode corresponds to one of modes other than the first mode.

Advantageous Effects

According to an embodiment of the present disclosure, an intra prediction mode to be encoded/decoded is distinguished by using a dominant mode flag in encoding/decoding intra prediction information and an encoding/decoding method is defined for each intra prediction mode to reduce a data amount required for intra prediction and computation complexity.

Effects that can be achieved by embodiments of the present disclosure are not limited to effects that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the present disclosure.

FIG. 1 illustrates an example of a video coding system according to an embodiment of the present disclosure.

FIG. 2 illustrates a schematic block diagram of an encoding apparatus, for encoding a video signal, according to an embodiment of the present disclosure.

FIG. 3 illustrates a schematic block diagram of a decoding apparatus, for decoding a video signal, according to an embodiment of the present disclosure.

FIG. 4 illustrates an example of a content streaming system according to an embodiment of the present disclosure.

FIG. 5 illustrates an example of a video signal processing device according to an embodiment of the present disclosure.

FIGS. 6a to 6d illustrate an example of a block partitioning structure according to an embodiment of the present disclosure.

FIG. 7 illustrates an example of a flowchart for encoding a picture constituting a video signal according to an embodiment of the present disclosure.

FIG. 8 illustrates an example of a flowchart for decoding a picture constituting a video signal according to an embodiment of the present disclosure.

FIG. 9 illustrates an example of a flowchart for intra prediction in the process of encoding a video signal according to an embodiment of the present disclosure.

FIG. 10 illustrates an example of an intra prediction unit in an encoding apparatus according to an embodiment of the present disclosure.

FIG. 11 illustrates an example of a flowchart for intra prediction in the process of decoding a video signal according to an embodiment of the present disclosure.

FIG. 12 illustrates an example of an intra prediction unit in a decoding apparatus according to an embodiment of the present disclosure.

FIG. 13 illustrates an example of a flowchart for encoding intra prediction information in the process of encoding a video signal according to an embodiment of the present disclosure.

FIG. 14 illustrates an example of a flowchart for decoding intra prediction information in the process of decoding a video signal according to an embodiment of the present disclosure.

FIG. 15 illustrates an example of a flowchart for determining an intra prediction mode in the process of decoding a video signal according to an embodiment of the present disclosure.

FIG. 16 illustrates an example of 33 directional intra prediction modes according to an embodiment of the present disclosure.

FIG. 17 illustrates an example of 65 directional intra prediction modes according to an embodiment of the present disclosure.

FIG. 18 illustrates an example of a flowchart constructing a most probable mode (MPM) candidate list according to an embodiment of the present disclosure.

FIG. 19 illustrates an example of reference samples considering multi-reference line (MRL) intra prediction according to an embodiment of the present disclosure.

FIGS. 20a and 20b illustrate an example of block partitioning depending on intra sub-partition (ISP) according to an embodiment of the present disclosure.

FIG. 21 is a diagram for describing multiple direct modes (DMs) for intra prediction of a chroma block according to an embodiment of the present disclosure.

FIG. 22 illustrates an example of a sample location for deriving parameters of a cross-component linear model (CCLM) mode for intra prediction of a chroma block according to an embodiment of the present disclosure.

FIG. 23 illustrates an example of a flowchart for encoding/decoding intra prediction information by using a dominant mode flag according to an embodiment of the present disclosure.

FIG. 24 illustrates an example of a case of generating an MPM list according to an embodiment of the present disclosure.

FIG. 25 illustrates another example of a flowchart for encoding/decoding intra prediction information by using a dominant mode flag according to an embodiment of the present disclosure.

FIG. 26 illustrates yet another example of a flowchart for encoding/decoding intra prediction information by using a dominant mode flag according to an embodiment of the present disclosure.

FIG. 27 illustrates an example of a flowchart for intra prediction in the process of encoding a video signal according to an embodiment of the present disclosure.

FIG. 28 illustrates an example of a flowchart for intra prediction in the process of decoding a video signal according to an embodiment of the present disclosure.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 illustrates an example of a video coding system according to an embodiment of the present disclosure. The video coding system may include a source device 10 and a receive device 20. The source device 10 can transmit encoded video/image information or data to the receive device 20 in the form of a file or streaming through a digital storage medium or a network.

The source device 10 may include a video source 11, an encoding apparatus 12, and a transmitter 13. The receive device 20 may include a receiver, a decoding apparatus 22 and a renderer 23. The encoding apparatus 12 may be called a video/image encoding apparatus and the decoding apparatus 22 may be called a video/image decoding apparatus. The transmitter 13 may be included in the encoding apparatus 12. A receiver 21 may be included in the decoding apparatus 22. The renderer 23 may include a display and the display may be configured as a separate device or an external component.

The video source 11 may obtain a video/image through a process of capturing, combining or generating the video/image. The video source 11 may include a video/image capture device and/or a video/image generation device. The video/image capture device may include, for example, one or more cameras and a video/image archive including previously captured videos/images. The video/image generation device may include, for example, a computer, a tablet, and a smartphone and (electronically) generate a video/image. For example, a virtual video/image may be generated through a computer, and in this case, a video/image capture process may be replaced with a related data generation process.

The encoding apparatus 12 may encode an input video/image. The encoding apparatus 12 may perform a series of procedures, such as prediction, transform and quantization, for compression and coding efficiency. Encoded data (encoded video/image information) may be output in the form of a bitstream.

The transmitter 13 may transmit encoded video/image information or data output in the form of a bitstream to the receiver 21 of the receive device 20 in the form of file or streaming via a digital storage medium or a network. The digital storage medium may include various storage media such as a universal serial bus (USB), a secure digital (SD) card, a compact disc (CD), a digital versatile disc (DVD), a blue-ray disc, a hard disk drive (HDD), and a solid state drive (SSD). The transmitter 13 may include an element for generating a media file through a predetermined file format, and may include an element for transmission via a broadcast/communication network. The receiver 21 may extract a bitstream and transmit the bitstream to the decoding apparatus 22.

The decoding apparatus 22 may decode a video/image by performing a series of procedures such as dequantization, inverse transform and prediction corresponding to operation of the encoding apparatus 12.

The renderer 23 may render the decoded video/image. The rendered video/image may be display through a display.

FIG. 2 illustrates an example of a schematic block diagram of an encoding apparatus, for encoding a video signal, according to an embodiment of the present disclosure. An encoding apparatus 100 of FIG. 2 may correspond to the encoding apparatus 12 of FIG. 1.

An image partitioning module 110 may partition an input image (or a picture or a frame) input to the encoding apparatus 100 into one or more processing units. For example, the processing unit may be called a coding unit (CU). In this case, the coding unit may be recursively partitioned from a coding tree unit (CTU) or a largest coding unit (LCU) according to a quad-tree binary-tree (QTBT) structure. For example, one coding unit may be partitioned into a plurality of coding units with a deeper depth based on the quad-tree structure and/or the binary tree structure. In this case, for example, the quad-tree structure may be first applied, and then the binary tree structure may be applied. Alternatively, the binary tree structure may be first applied. A coding procedure according to an embodiment of the present disclosure may be performed based on a final coding unit that is no longer partitioned. In this case, a largest coding unit may be directly used as the final coding unit based on coding efficiency according to image characteristics. Alternatively, the coding unit may be recursively partitioned into coding units with a deeper depth, and thus a coding unit with an optimal size may be used as the final coding unit, if necessary or desired. Here, the coding procedure may include procedures such as prediction, transform and reconstruction which will be described later. As another example, the processing unit may further include a prediction unit (PU) or a transform unit (TU). In this case, the prediction unit and the transform unit may be partitioned from the above-described coding unit. The prediction unit may be a unit of sample prediction, and the transform unit may be a unit of deriving a transform coefficient or a unit of deriving a residual signal from a transform coefficient.

The term 'unit' used in the present disclosure may be interchangeably used with the term 'block' or 'area', if necessary or desired. In the present disclosure, an M×N block may represent a set of samples or transform coefficients consisting of M columns and N rows. A sample may generally represent a pixel or a pixel value, and may represent a pixel/pixel value of a luma component or represent a pixel/pixel value of a chroma component. The sample may be used as a term for corresponding one picture (or image) to a pixel or a pel.

The encoding apparatus 100 may subtract a predicted signal (a predicted block or a predicted sample array) output from an inter-prediction module 180 or an intra-prediction module 185 from an input video signal (an original block or an original sample array) to generate a residual signal (a residual block or a residual sample array). The generated residual signal may be transmitted to the transform module 120. In this case, as shown, a unit which subtracts the predicted signal (predicted block or predicted sample array) from the input video signal (original block or original sample array) in the encoding apparatus 100 may be called a subtraction module 115. A prediction module may perform prediction on a processing target block (hereinafter, referred to as a current block) and generate a predicted block including predicted samples for the current block. The prediction module may determine whether to apply intra-prediction or inter-prediction on a per CU basis. The prediction module may generate various types of information on prediction, such as prediction mode information, and transmit the information on prediction to an entropy encoding module 190 as described later in description of each prediction mode. The information on prediction may be encoded in the entropy encoding module 190 and output in the form of a bitstream.

The intra-prediction module 185 may predict the current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include, for example, a DC mode and a planar mode. The directional modes may include, for example, 33 directional prediction modes or 65 directional prediction modes according to a degree of minuteness of prediction direction. However, this is merely an example, and a number of directional prediction modes equal to or greater than 65 or equal to or less than 33 may be used according to settings. The intra-prediction module 185 may determine a prediction mode to be applied to the current block using a prediction mode applied to neighbor blocks.

The inter-prediction module 180 may derive a predicted block for the current block based on a reference block (reference sample array) specified by a motion vector on a reference picture. To reduce an amount of motion information transmitted in an inter-prediction mode, the inter-prediction module 180 may predict motion information based on correlation of motion information between a neighboring block and the current block on a per block, subblock or sample basis. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU), and the reference picture including the temporal neighboring block may be called a collocated picture (colPic). For example, the inter-prediction module 180 may construct a motion information candidate list based on motion information of neighboring blocks and generate information indicating which candidate is used to derive a motion vector and/or a reference picture index of the current block. The inter-prediction may be performed based on various prediction modes. For example, in the case of a skip mode and a merge mode, the inter-prediction module 180 may use motion information of a neighboring block as motion information of the current block. In the skip mode, a residual signal is not be transmitted, unlike the merge mode. In a motion vector prediction (MVP) mode, the motion vector of the current block may be indicated by using a motion vector of a neighboring block as a motion vector predictor and signaling a motion vector difference (MVD).

A predicted signal generated by the inter-prediction module 180 or the intra-prediction module 185 may be used to generate a reconstructed signal or a residual signal.

The transform module 120 may apply a transform technique to a residual signal to generate transform coefficients. For example, the transform technique may include at least one of discrete cosine transform (DCT), discrete sine transform (DST), Karhunen-Loeve transform (KLT), graph-based transform (GBT), and conditionally non-linear transform (CNT). The GBT refers to transform obtained from a graph representing information on a relationship between pixels. The CNT refers to transform obtained based on a predicted signal generated using all previously reconstructed pixels. Further, the transform process may be applied to square pixel blocks with the same size, or applied to non-square blocks or blocks with variable sizes.

A quantization module 130 may quantize transform coefficients and transmit the quantized transform coefficients to the entropy encoding module 190. The entropy encoding module 190 may encode a quantized signal (information on the quantized transform coefficients) and output the encoded signal as a bitstream. The information on the quantized transform coefficients may be called residual information. The quantization module 130 may rearrange the quantized transform coefficients of the block form in the form of one-dimensional (1D) vector based on a coefficient scan order and generate information about the quantized transform coefficients based on characteristics of the quantized transform coefficients of the one-dimensional vector form. The entropy encoding module 190 may perform various encoding schemes such as exponential Golomb, context-adaptive variable length coding (CAVLC), and context-adaptive binary arithmetic coding (CABAC). The entropy encoding module 190 may encode information necessary for video/image reconstruction (e.g., values of syntax elements) along with or separately from the quantized transform coefficients. Encoded information (e.g., video/image information) may be transmitted or stored in the form of a bitstream in network abstraction layer (NAL) unit. The bitstream may be transmitted through a network or stored in a digital storage medium. Here, the network may include a broadcast network and/or a communication network, and the digital storage medium may include various storage media such as USB, SD, CD, DVD, Blueray, HDD and SSD. A transmitter (not shown) which transmits the signal output from the entropy encoding module 190 and/or a storage (not shown) which stores the signal may be configured as internal/external elements of the encoding apparatus 100, or the transmitter may be a component of the entropy encoding module 190.

The quantized transform coefficients output from the quantization module 130 may be used to generate a reconstructed signal. For example, a residual signal can be reconstructed by applying dequantization and inverse transform to the quantized transform coefficients through a dequantization module 140 and an inverse transform module 150 in the loop. An addition module 155 may add the reconstructed residual signal to the predicted signal output from the inter-prediction module 180 or the intra-prediction module 185 to generate a reconstructed signal (reconstructed picture, reconstructed block or reconstructed sample array). When there is no residual signal for a processing target block as in a case in which the skip mode is applied, a predicted block may be used as a reconstructed block. The addition module 155 may also be called a reconstruction unit or a reconstructed block generator. The generated reconstructed signal can be used for intra-prediction of the next processing target block in the current picture or used for inter-prediction of the next picture through filtering which will be described later.

A filtering module 160 can improve subjective/objective picture quality by applying filtering to the reconstructed signal. For example, the filtering module 160 may generate a modified reconstructed picture by applying various filtering methods to the reconstructed picture and transmit the modified reconstructed picture to a decoded picture buffer (DBP) 170. Examples of the various filtering methods may include deblocking filtering, sample adaptive offset (SAO), adaptive loop filtering (ALF), and bilateral filtering. The filtering module 160 may generate information on filtering and transmit the information on filtering to the entropy encoding module 190 as will be described later in description of each filtering method. The information on filtering may be output in the form of a bitstream through entropy encoding in the entropy encoding module 190.

The modified reconstructed picture transmitted to the decoded picture buffer 170 may be used as a reference picture in the inter-prediction module 180. When inter-prediction is applied, the encoding apparatus 100 can avoid mismatch between the encoding apparatus 100 and the decoding apparatus 200 using the modified reconstructed picture and improve encoding efficiency. The decoded picture buffer 170 may store the modified reconstructed picture such that the modified reconstructed picture is used as a reference picture in the inter-prediction module 180.

FIG. 3 illustrates an example of a schematic block diagram of a decoding apparatus which performs decoding of a video signal according to an embodiment of the present disclosure. The decoding apparatus 200 of FIG. 3 corresponds to the decoding apparatus 22 of FIG. 1.

Referring to FIG. 3, the decoding apparatus 200 may include an entropy decoding module 210, a dequantization module 220, an inverse transform module 230, an addition module 235, a filtering module 240, a decoded picture buffer (DPB) 250, an inter-prediction module 260, and an intra-prediction module 265. The inter-prediction module 260 and the intra-prediction module 265 may be collectively called a prediction module. That is, the prediction module may include the inter-prediction module 180 and the intra-prediction module 185. The dequantization module 220 and the inverse transform module 230 may be collectively called a residual processing module. That is, the residual processing module may include the dequantization module 220 and the inverse transform module 230. In some embodiments, the entropy decoding module 210, the dequantization module 220, the inverse transform module 230, the addition module 235, the filtering module 240, the inter-prediction module 260, and the intra-prediction module 265 described above may be configured as a single hardware component (e.g., a decoder or a processor). In some embodiments, the decoded picture buffer 250 may be configured as a single hardware component (e.g., a memory or a digital storage medium).

When a bitstream including video/image information is input, the decoding apparatus 200 may reconstruct an image through a process corresponding to the process of processing the video/image information in the encoding apparatus 100 of FIG. 2. For example, the decoding apparatus 200 may perform decoding using a processing unit applied in the encoding apparatus 100. Thus, a processing unit upon the decoding may be a coding unit, for example, and the coding unit may be partitioned from a coding tree unit or a largest coding unit according to a quadtree structure and/or a binary tree structure. In addition, a reconstructed video signal decoded and output by the decoding apparatus 200 may be reproduced through a reproduction apparatus.

The decoding apparatus 200 may receive a signal output from the encoding apparatus 100 of FIG. 2 in the form of a bitstream, and the received signal may be decoded through the entropy decoding module 210. For example, the entropy decoding module 210 may parse the bitstream to derive information (e.g., video/image information) necessary for image reconstruction (or picture reconstruction). For example, the entropy decoding module 210 may obtain information in the bitstream using a coding scheme such as exponential Golomb, CAVLC or CABAC, and output a syntax element value necessary for image reconstruction and a quantized value of transform coefficients for residual. More specifically, the CABAC entropy decoding method may receive a bin corresponding to each syntax element in the bitstream, determine a context model using decoding target syntax element information and decoding information of neighboring and decoding target blocks or information on symbols/bins decoded in a previous stage, predict the probability of generation of the bin according to the determined context model, and perform arithmetic decoding of bins to thereby generate a symbol corresponding to each syntax element value. The CABAC entropy decoding method can update the context model using information on symbols/bins decoded for the next symbol/bin context model after the context model is determined. Information about prediction among the information decoded in the entropy decoding module 210 may be provided to the prediction module (the inter-prediction module 260 and the intra-prediction module 265), and residual values, on which entropy decoding has been performed in the entropy decoding module 210, that is, quantized transform coefficients and related parameter information may be input to the dequantization module 220. Further, information on filtering among the information decoded in the entropy decoding module 210 may be provided to the filtering module 240. A receiver (not shown) receiving a signal output from the encoding apparatus 100 may be additionally configured as an internal/external element of the decoding apparatus 200, or the receiver may be a component of the entropy decoding module 210.

The dequantization module 220 may output transform coefficients through dequantization of the quantized transform coefficients. The dequantization module 220 may rearrange the quantized transform coefficients in the form of a two-dimensional (2D) block. In this case, rearrangement may be performed based on the coefficient scan order performed in the encoding apparatus 100. The dequantization module 220 may perform dequantization on the quantized transform coefficients using a quantization parameter (e.g., quantization step size information) and obtain transform coefficients.

The inverse transform module 230 inversely transforms the transform coefficients to obtain a residual signal (residual block or residual sample array).

The prediction module may perform prediction on a current block and generate a predicted block including predicted samples for the current block. The prediction module may determine whether intra-prediction or inter-prediction is applied to the current block based on information on prediction output from the entropy decoding module 210, and determine a specific intra/inter-prediction mode.

The intra-prediction module 265 may predict the current block with reference to samples in a current picture. The referred samples may neighbor the current block or may be separated from the current block according to a prediction mode. In intra-prediction, prediction modes may include a plurality of nondirectional modes and a plurality of directional modes. The intra-prediction 265 may determine a prediction mode applied to the current block using a prediction mode applied to neighboring blocks.

The inter-prediction module 260 may derive a predicted block for the current block based on a reference block (reference sample array) specified by a motion vector on a reference picture. To reduce an amount of motion information transmitted in the inter-prediction mode, the motion information may be predicted based on correlation of motion information between a neighboring block and the current block on a per block, subblock or sample basis. The motion information may include a motion vector and a reference picture index. The motion information may further include inter-prediction direction (L0 prediction, L1 prediction, Bi prediction) information. In the case of inter-prediction, the neighboring blocks may include a spatial neighboring block present in a current picture and a temporal neighboring block present in a reference picture. For example, the inter-prediction module 260 may construct a motion information candidate list based on neighboring blocks and derive the motion vector and/or the reference picture index of the current block based on received candidate selection information. The inter-prediction may be performed based on various prediction modes, and information on prediction may include information indicating the inter-prediction mode for the current block.

The addition module 235 can generate a reconstructed signal (reconstructed picture, reconstructed block or reconstructed sample array) by adding the obtained residual signal to the predicted signal (predicted block or predicted sample array) output from the inter-prediction module 260 or the intra-prediction module 265. When there is no residual for the processing target block as in a case in which the skip mode is applied, the predicted block may be used as a reconstructed block.

The addition module 235 may also be called a reconstruction unit or a reconstructed block generator. The generated reconstructed signal may be used for intra-prediction of a next processing target block in the current picture or used for inter-prediction of a next picture through filtering which will be described later.

The filtering module 240 can improve subjective/objective picture quality by applying filtering to the reconstructed signal. For example, the filtering module 240 may generate a modified reconstructed picture by applying various filtering methods to the reconstructed picture, and transmit the modified reconstructed picture to a decoded picture buffer 250. Examples of the various filtering methods may include deblocking filtering, sample adaptive offset, adaptive loop filtering, and bilateral filtering.

The modified reconstructed picture transmitted to the decoded picture buffer 250 may be used as a reference picture by the inter-prediction module 260.

In the present disclosure, implementations described in the filtering module 160, the inter-prediction module 180, and the intra-prediction module 185 of the encoding apparatus 100 can be applied to the filtering module 240, the inter-prediction module 260 and the intra-prediction module 265 of the decoding apparatus equally or in a corresponding manner.

FIG. 4 illustrates an example of a content streaming system according to an embodiment of the present disclosure. A content streaming system to which an embodiment of the present disclosure is applied may roughly include an encoding server 410, a streaming server 420, a web server 430, a media storage 440, a user equipment 450, and a multimedia input device 460.

The encoding server 410 compresses content input from a multimedia input device 460 such as a smartphone, a camera, and a camcorder into digital data to generate a bitstream, and transmits the generated bitstream to the streaming server 420. As another example, when the multimedia input device 460 such as a smartphone, a camera and a camcorder directly generates the bitstream, the encoding server 410 may be omitted.

The bitstream may be generated by an encoding method or a bitstream generation method to which an embodiment of the present disclosure is applied, and the streaming server 420 may temporarily store the bitstream in the process of transmitting or receiving the bitstream.

The streaming server 420 transmits multimedia data to the user equipment 450 based on a user request via the web server 430, and the web server 430 serves as a medium that informs a user of types of services. If the user sends a request for a desired service to the web server 430, the web server 430 sends information on the requested service to the streaming server 420, and the streaming server 420 transmits multimedia data to the user. The content streaming system may include a separate control server, and in this case, the control server serves to control commands/responses between the respective devices in the content streaming system.

The streaming server 420 may receive content from the media storage 440 and/or the encoding server 410. For example, if content is received from the encoding server 410, the streaming server 420 may receive the content in real time. In this case, the streaming server 420 may store a bitstream for a predetermined time in order to provide a smooth streaming service.

Examples of the user equipment 450 may include a cellular phone, a smartphone, a laptop computer, a digital broadcast terminal, a personal digital assistant (PDA), a portable multimedia player (PMP), a navigation, a slate PC, a tablet PC, an ultrabook, a wearable device (e.g., a smartwatch, a smart glass, and a head mounted display (HMD)), a digital TV, a desktop computer, and a digital signage.

Each server in the content streaming system may be operated as a distributed server, and in this case, data received by each server may be distributed and processed.

FIG. 5 illustrates an example of a video signal processing device according to an embodiment of the present disclosure. The video signal processing apparatus of FIG. 5 may correspond to the encoding apparatus 100 of FIG. 1 or the decoding apparatus 200 of FIG. 2.

A video processing device 500 for processing the video signal includes a memory 520 storing the video signal and a processor 520 processing the video signal in connection with the memory 510. The processor 510 according to an embodiment of the present disclosure may be configured as at least one processing circuit for processing the video signal, and process the video signal by executing commands for encoding/decoding the video signal. That is, the processor 510 may encode original video data or decode the encoded video signal by executing encoding/decoding methods to be described below.

As described below, the processor 510 according to an embodiment of the present disclosure is configured to determine an intra prediction mode of a current block and generate intra prediction information based on the intra prediction mode, and herein, when the intra prediction information includes a first flag (dominant mode flag), and when the first flag is coded with a first value when the intra prediction mode corresponds to a predetermined first mode and coded with a second value when the intra prediction mode corresponds to one of modes of the first mode.

In an embodiment, the first mode may correspond to a non-directional mode, and the non-directional mode may include at least one of a planar mode or a DC mode.

In an embodiment, when the first flag corresponds to the first value, the intra prediction information may further include a second flag indicating one of the planar mode and the DC mode.

In an embodiment, in the process of generating the intra prediction information, the processor 510 may be configured to constitute a most probable mode candidate list including MPM candidates when the intra prediction mode corresponds to one of the modes other than the first mode, and here, the MPM candidate list is constituted based on intra prediction modes other than the first mode among all modes, and the processor 510 may be configured to code an MPM index indicating one of the MPM candidates in the MPM candidate list as the intra prediction information when the intra prediction mode corresponds to one of the MPM candidates and code a remaining index indicating one of remaining candidates other than the first mode and the MPM candidates among the all modes as the intra prediction information when the intra prediction mode is not included in the MPM candidate list.

As described later, for decoding the video signal, the processor 510 according the embodiment of the present disclosure are configured to obtain intra prediction information of a current block to which intra prediction is applied, here, the intra prediction information includes a first flag (dominant mode flag) indicating a predetermined first mode, determine the intra prediction mode of the current block based on the intra prediction information, and here, when the first flag corresponds to a first value, the first mode is determined as the intra prediction mode and when the first flag corresponds to a second value, one of a plurality of candidate modes is determined as the intra prediction mode, and generate a prediction sample of the current block based on the intra prediction mode and a reference sample in a current picture.

In an embodiment, the first mode may correspond to a non-directional mode, and the non-directional mode may include at least one of a planar mode or a DC mode.

The processor may be configured to obtain a second flag indicating whether to use the planar mode, in the process of obtaining the intra prediction information, and the intra prediction mode of the current block may be determined as one of the planar mode and the DC mode based on the second flag.

In an embodiment, the second flag may be parsed when the first flag corresponds to the first value and the current block is not partitioned by intra sub-partition (ISP).

In an embodiment, when the first flag corresponds to the first value and the current block is partitioned by the intra sub-partition (ISP), the intra prediction mode may be determined as the planar mode.

In an embodiment, the processor 510 may be configured to obtain information on a location of a reference sample for prediction of the current block, obtain the first flag when reference samples positioned on a line adjacent to the current block are used, and obtaining prediction mode indication information when reference samples positioned spaced apart from the current block by a 2-sample distance or more are used, in the process of obtaining intra prediction information, and the prediction mode indication information may include an MPM index indicating one of most probable mode (MPM) candidate modes or a remaining index indicating one of remaining candidates other than the first mode and the MPM candidate modes among all modes.

In an embodiment, the processor 510 may be configured to determine whether to use the MPM candidate modes based on an MPM flag, and obtain the MPM index when the MPM candidate modes are used and obtain the remaining index when the MPM candidate modes are not used.

In an embodiment, the processor 510 may be configured to configure an MPM candidate list including the MPM candidate modes when the first flag corresponds to the second value, in the processor of determining the intra prediction mode, and the MPM candidate list may be configured based on intra prediction modes other than the first mode among the all modes.

In an embodiment, the processor 510 may be configured to obtain a reference index indicating the location of the reference sample for prediction of the current block, and obtain the first flag when the reference samples positioned spaced apart from the current block by a 2-sample distance or more are used, in the process of obtaining the intra prediction information, and when the first flag corresponds to the first value, the intra prediction mode of the current block may be determined as the DC mode.

FIGS. 6a to 6d illustrate an example of a block partitioning structure according to an embodiment of the present disclosure. FIGS. 6a, 6b, 6c, and 6d illustrate examples of block partitioning structures by quadtree (QT), binary tree (BT), ternary tree (TT), and asymmetric tree (AT), respectively.

In the video coding system, one block may be partitioned based on a QT partitioning scheme. One subblock partitioned using the QT partitioning scheme may be further recursively partitioned according to the QT partitioning scheme. A leaf block that is no longer partitioned by the QT partitioning scheme may be partitioned using at least one of BT, TT, or AT partitioning scheme. BT may have two types of partitions such as horizontal BT (2N×N, 2N×N) and vertical BT (N×2N, N×2N). TT may have two types of partitions such as horizontal TT (2N×1/2N, 2N×N, 2N×1/2N) and vertical TT (1/2N×2N, N×2N, 1/2N×2N). AT may have four types of partitions such as horizontal-up AT (2N×1/2N, 2N×3/2N), horizontal-down AT (2N×3/2N, 2N×1/2N), vertical-left AT (1/2N×2N, 3/2N×2N), and vertical-right AT (3/2N×2N, 1/2N×2N). Each of BT, TT and AT may be further recursively partitioned using BT, TT and AT.

FIG. 6a illustrates an example of QT partition. A block A may be partitioned into four subblocks A0, A1, A2 and A3 by QT. The subblock A1 may be further partitioned into four subblocks B0, B1, B2 and B3 by QT.

FIG. 6b illustrates an example of BT partition. The block B3 that is no longer partitioned by QT may be partitioned by vertical BT (C0, C1) or horizontal BT (D0, D1). Each subblock such as the block C0 may be further recursively partitioned as in the form of horizontal BT (E0, E1) or vertical BT (F0, F1).

FIG. 6c illustrates an example of TT partition. The block B3 that is no longer partitioned by QT may be partitioned into vertical TT (C0, C1, C2) or horizontal TT (D0, D1, D2). Each subblock such as the block Cl may be further recursively partitioned as in the form of horizontal TT (E0, E1, E2) or vertical TT (F0, F1, F2).

FIG. 6d illustrates an example of AT partition. The block B3 that is no longer partitioned by QT may be partitioned into vertical AT (C0, C1) or horizontal AT (D0, D1). Each subblock such as the block Cl may be further recursively partitioned as in the form of horizontal AT (E0, E1) or vertical TT (F0, F1).

BT, TT and AT partitions may be applied to one block together. For example, a subblock partitioned by BT may be partitioned by TT or AT. Further, a subblock partitioned by TT may be partitioned by BT or AT. A subblock partitioned by AT may be partitioned by BT or TT. For example, after horizontal BT partition, each subblock may be partitioned by vertical BT. After vertical BT partition, each subblock may also be partitioned by horizontal BT. In this case, partition orders are different, but finally partitioned shapes are the same.

If a block is partitioned, a block search order may be variously defined. In general, search is performed from left to right and from top to bottom, and searching the block may mean the order of determining whether each partitioned subblock is additionally partitioned, or mean an encoding order of each subblock when the block is no longer partitioned, or mean a search order when a subblock refers to information of other neighboring block.

Image/Video Coding Procedure

In image/video coding, a picture constructing the image/video may be encoded/decoded according to a series of decoding order. A picture order corresponding to an output order of a decoded picture may be configured differently fro the coding order, and not only forward prediction but also inverse prediction may be performed.

FIG. 7 illustrates an example of a flowchart for encoding a picture constituting a video signal according to an embodiment of the present disclosure. In FIG. 7, step S710 may be performed by the prediction units 180 and 185 of the encoding apparatus 100 described in FIG. 2, step S720 may be performed by the residual processing units 115, 120, and 130, and step S730 may be performed by the entropy encoding unit 190. Step S710 may include an inter/intra prediction procedure described in the present disclosure, step S720 may include a residual processing procedure described in the present disclosure, and step S730 may include an information encoding procedure described in the present disclosure.

Referring to FIG. 7, a picture encoding procedure may schematically include a procedure of encoding information (e.g., prediction information, residual information, and partitioning information) and outputting the encoded information in the form of the bitstream as described in FIG. 2, and a procedure of generating a reconstructed picture for the current picture and a procedure (optional) of applying in-loop filtering to the reconstructed picture. The encoding apparatus 100 may derive (modified) residual samples from a transform coefficient quantized through the dequantization unit 140 and the inverse transform unit 150, and may generate the reconstructed picture based on prediction samples and the (modified) residual samples corresponding to the output in step S710. The generated reconstructed picture may be the same as the reconstructed picture generated by the decoding apparatus 200. A modified reconstructed picture may be generated through an in-loop filtering procedure for the reconstructed picture, and may be stored in a decoded picture buffer 170 or a memory, and as in the case in the decoding apparatus 200, the modified reconstructed picture may be used as a reference picture in an inter prediction procedure during encoding the picture. As described above, in some cases, a part or the entirety of the in-loop filtering procedure may be omitted. When the in-loop filtering procedure is performed, (in-loop) filtering related information (parameter) may be encoded by the entropy encoding unit 190 and output in the form of the bitstream, and the decoding apparatus 200 may perform the in-loop filtering procedure in the same method as the encoding apparatus 100 based on filtering related information.

Through the in-loop filtering procedure, noise generated during video/moving picture coding may be reduced, such as a blocking artifact and a ringing artifact, and a subjective/objective visual quality may be improved. Further, both the encoding apparatus 100 and the decoding apparatus 200 perform the in-loop filtering procedure, and as a result, the encoding apparatus 100 and the decoding apparatus 200 may derive the same prediction procedure, and increase reliability of picture coding and reduce the amount of data transmitted for the picture coding.

FIG. 8 illustrates an example of a flowchart for decoding a picture constituting a video signal according to an embodiment of the present disclosure. Step S810 may be performed by the entropy decoding unit 210 in the decoding apparatus 200 of FIG. 3, step S820 may be performed by the prediction units 260 and 265, step S830 may be performed by the residual processing units 220 and 230, step S840 may be performed by the addition unit 235, and step S850 may be performed by the filtering unit 240. Step S810 may include the information decoding procedure described in the present disclosure, step S820 may include the inter/intra prediction procedure described in the present disclosure, step S830 may include the residual processing procedure described in the present disclosure, step S840 may include the block/picture constructing procedure described in the present disclosure, and step S850 may include the in-loop filtering procedure described in the present disclosure.

Referring to FIG. 8, the picture decoding procedure may schematically include an image/video information obtaining procedure (S810) (through decoding) from the bitstream, a picture reconstructing procedure (S820 to S840), and an in-loop filtering procedure (S850) for the reconstructed picture as described in FIG. 2. The picture reconstructing procedure may be performed based on the prediction samples and the residual samples obtained through the processes of the inter-intra prediction 820 and the residual processing 830 (dequantization and inverse transform for the quantized transform or coefficient) described in the present disclosure. The modified reconstructed picture may be generated through the in-loop filtering procedure for the reconstructed picture generated through the picture reconstructing procedure, and the modified reconstructed picture may be output as the decoded picture, and further, the modified reconstructed picture may be stored in the DPB 250 or the memory of the decoding apparatus 200 and used as the reference picture in the inter prediction procedure during decoding subsequent decoding of the picture. In some cases, the in-loop filtering procedure may be omitted, and in this case, the reconstructed picture may be output as the decoded picture, and further, the modified reconstructed picture may be stored in the DPB 250 or the memory of the decoding apparatus 200 and used as the reference picture in the inter prediction procedure during decoding subsequent decoding of the picture. The in-loop filtering procedure S850 may include a deblocking filtering procedure, a sample adaptive offset (SAO) procedure, an adaptive loop filter (ALF) procedure, and/or a bi-lateral filter procedure, and some or all thereof may be omitted. Further, one or some of the deblocking filtering procedure, the SAO procedure, the ALF procedure, the bi-lateral filter procedure may be sequentially applied or all procedures may be sequentially applied. For example, after the deblocking filtering procedure is applied to the reconstructed picture, the SAO procedure may be performed. Further, for example, after the deblocking filtering procedure is applied to the reconstructed picture, the ALF procedure may be performed. This may be performed similarly even in the encoding apparatus 100.

As described above, the picture reconstructing procedure may be performed even in the encoding apparatus 100 in addition to the decoding apparatus 200. The reconstructed block may be generated based on the intra prediction/inter prediction in units of each block, and the reconstructed picture including the reconstructed blocks may be generated. When the current picture/slice tile group is the I picture/slice/tile group, blocks included in the current picture/slice/tile group may be reconstructed based on only the intra prediction. In this case, the inter prediction may be applied to some blocks in the current picture/slice/tile group, and the intra prediction may be applied to some remaining blocks. Color components of the picture may include a luma component and a chroma component, and when not explicitly limited in the present disclosure, methods and embodiments proposed in the present disclosure may be applied to the luma component and the chroma component.

Intra Prediction

An embodiment of the present disclosure relates to an intra prediction method, and in the case of a decoder, the intra prediction method may be represented as an intra prediction based video/image decoding method in FIG. 11 and an intra prediction unit 265 in the decoding apparatus 200 in FIG. 12. Moreover, in the case of a decoder, the intra prediction method may be represented as an intra prediction based video/image encoding method in FIG. 9 and an intra prediction unit in the encoding apparatus 100 in FIG. 10. In this case, data encoded by FIGS. 9 and 10 may be stored in the form of a bitstream.

The intra prediction may represent prediction of generating prediction samples for the current block based on reference samples in a picture (hereinafter, referred to as the current picture) to which the current block belongs. When the intra prediction is applied to the current block, neighboring reference samples to be used for the intra prediction of the current block may be derived. The neighboring reference samples of the current block may include a sample adjacent to a left boundary of the current block having a size of nW×nH and a total of 2×nH samples adjacent to a bottom left side, a sample adjacent to an upper boundary of the current block, and a total of 2×nW adjacent to a top right side, and one sample adjacent to a top left side of the current block. Alternatively, the neighboring reference samples of the current block may include a plurality of columns of upper neighboring samples of a plurality of rows of left neighboring samples. Furthermore, the neighboring reference samples of the current block may include a total of nH samples adjacent to a right boundary of the current block having a size of nW×nH, a total of nW samples adjacent to a bottom boundary of the current block, and one sample neighboring to a bottom-right side of the current block.

However, some of the neighboring reference samples of the current block may not yet be decoded or may not be available. In this case, the decoder may configure the neighboring reference samples to be used for the prediction by substituting samples which are not available as the available samples. Alternatively, the neighboring reference samples to be used for the prediction may be configured through interpolation of the available samples.

When the neighboring reference samples are derived, i) prediction samples may be derived based on an average or interpolation of the neighboring reference samples of the current block, and ii) the prediction sample may be derived based on a reference sample which exists in a specific (prediction) direction for the prediction sample among the neighboring reference samples of the current block. A prediction mode such as i) may be referred to as a non-directional prediction mode or a non-angular prediction mode, and a prediction mode such as ii) may be referred to as a directional prediction mode or an angular prediction mode. In addition, the prediction sample may be generated through interpolation of a second neighboring sample located in an opposite direction to the prediction direction based on the prediction sample (first neighboring sample) of the current block, and the first neighboring sample. The above-described case may be referred to as linear interpolation intra prediction (LIP). Further, chroma prediction samples may be generated based on luma samples by using a linear model. This case may be referred to as an LM mode. Further, a temporary prediction sample of the current block may be derived based on filtered neighboring reference samples, and the prediction sample of the current block may be derived through a weighted sum of at least one reference sample derived according to the intra prediction mode among the conventional neighboring reference samples, i.e., neighboring reference samples which are not filtered and the temporary prediction sample. This case may be referred to as a position dependent prediction combination (PDPC).

Further, the encoding apparatus selects a reference sample line having the highest prediction accuracy among multiple reference sample lines located on a neighbour to the current block to derive the prediction sample by using a reference sample located in a prediction direction in the corresponding line, and in this case, the encoding apparatus 200 may perform intra prediction encoding by a method for indicating (signaling) the used reference sample line to the decoding apparatus 200. This case may be referred to as multi-reference line (MRL) intra prediction or MRL based intra prediction. Further, the encoder/decoder may perform the intra prediction based on the same intra prediction mode by dividing the current block into vertical or horizontal sub-partitions, but derive and use neighboring reference samples in units of the sub-partition. That is, in this case, the intra prediction mode for the current block is equally applied to the sub-partitions, but the neighboring reference sample is derived and used in units of the sub-partition to enhance an intra prediction capability in some cases. Such a prediction method may be referred to as intra sub-partition (ISP) or ISP based intra prediction. The above-described intra predictions may be referred to as an intra prediction type so as to be distinguished form the legacy intra prediction mode. The intra prediction type may be referred to as various terms such as an intra prediction technique or an additional intra prediction mode. For example, the intra prediction type (or additional intra prediction mode) may include at least one of the above-described LIP, PDPC, MRL, and ISP. Meanwhile, postprocessing filtering may be performed on the derived prediction sample as necessary.

Specifically, the intra prediction procedure may include an intra prediction mode/type determining step, a neighboring reference sample deriving step, an intra prediction mode/type based prediction sample deriving step. Meanwhile, the postprocessing filtering step may be performed on the derived prediction sample as necessary.

FIG. 9 illustrates an example of a flowchart for intra prediction in the process of encoding a video signal according to an embodiment of the present disclosure and FIG. 10 illustrates an example of an intra prediction unit in an encoding apparatus according to an embodiment of the present disclosure.

In FIG. 9, step S910 may be performed by the intra prediction unit 185 of the encoding apparatus 100, and step S920 may be performed by the residual processing unit of the encoding apparatus 100. Specifically, step S92 may be performed the subtraction unit 115 of the encoding apparatus 100. In step S930, prediction information may be derived by the intra prediction unit 185 and encoded by the entropy encoding unit 190. In step S930, residual information may be derived by the residual processing unit and encoded by the entropy encoding unit 190. The residual information is information on the residual samples. The residual information may include information on quantized transform coefficients for the residual samples. As described above, the residual samples may be derived as transform coefficients by the transform unit 120 of the encoding apparatus 100 and the transform coefficients may be derived as transform coefficients quantized by the quantization unit 130. Information on the quantized transform coefficients may be encoded through a residual coding procedure by the entropy encoding unit 190.

The encoding apparatus 100 may perform intra prediction for the current block (S910). The encoding apparatus 100 may derive the intra prediction mode/type for the current block, derive the neighboring reference samples of the current block, and generates the prediction samples in the current block based on the intra prediction mode/type and the neighboring reference samples. Here, the determination of the intra prediction mode/type, the derivation of the neighboring reference samples, and the generation procedure of the prediction samples may be simultaneously performed or any one procedure may be performed earlier than other procedures. For example, the intra prediction unit 185 of the encoding apparatus 100 may include an intra prediction mode/type determining unit 186, a reference sample deriving unit 187, and a prediction sample deriving unit 188. The intra prediction mode/type determining unit 186 may determine the corresponding intra prediction mode/type of the current block, the reference sample deriving unit 187 may derive the neighboring reference samples of the current block, and the prediction sample deriving unit 188 may derive the prediction samples of the current block. Meanwhile, although not illustrated, when a prediction sample filtering procedure to be described below is performed, the intra prediction unit 185 may further include a prediction sample filter unit (not illustrated). The encoding apparatus 100 may determine a mode/type applied to the current block among a plurality of intra prediction modes/types. The encoding apparatus 100 may compare rate-distortion cost (RD cost) for the intra prediction modes/types and determine an optimal intra prediction mode/type for the current block.

Meanwhile, the encoding apparatus 100 may also perform a prediction sample filtering procedure. The prediction sample filtering may be called post filtering. Some or all of the prediction samples may be filtered by the prediction sample filtering procedure. In some cases, the prediction sample filtering procedure may be omitted.

The encoding apparatus 100 generates residual samples for the current block based on (filtered) prediction samples (S920). The encoding apparatus 100 may compare prediction samples in original samples of the current block based on a phase, and derive the residual samples.

The encoding apparatus 100 may encode image information including information on intra prediction (prediction information) and residual information related to residual samples (S930). The prediction information may include intra prediction mode information and intra prediction type information. The encoding apparatus 100 may output the encoded image information in the form of a bitstream. The outputted bitstream may be transferred to the decoding apparatus 200 via a storage medium or a network.

The residual information may include a residual coding syntax to be described below. The encoding apparatus 100 transforms/quantizes the residual samples to derive quantized transform coefficients. The residual information may include information on the quantized transform coefficients.

Meanwhile, as described above, the encoding apparatus 100 may generate a reconstructed picture (including reconstructed samples and reconstructed blocks). To this end, the encoding apparatus 100 dequantization/inverse transform-processes the quantized transform coefficients again to derive (modified) residual samples. A reason for transforming/quantizing the residual samples, and then performing dequantization/inverse transform again is to derive the same residual samples as the residual samples derived by the decoding apparatus 200 as described above. The encoding apparatus 100 may generate a reconstructed block including reconstructed samples for the current block based on the prediction samples and the (modified) residual samples. A reconstructed picture for a current picture may be generated based on the reconstructed block. The in-loop filtering procedure may be further applied to the reconstructed picture as described above.

FIG. 11 illustrates an example of a flowchart for intra prediction in the process of decoding a video signal according to an embodiment of the present disclosure and FIG. 12 illustrates an example of an intra prediction unit in a decoding apparatus 200 according to an embodiment of the present disclosure. Steps S1110 to S1130 may be performed by the intra prediction unit 265 of the decoding apparatus 200, and the prediction information in step S1110 and the residual information in step S1140 may be obtained from the bitstream by the entropy decoding unit 210. The residual processing unit of the decoding apparatus 200 may derive the residual samples for the current block based on the residual information. Specifically, the dequantization unit 220 of the residual processing unit may derive transform coefficients by performing dequantization based on quantized transform coefficients derived based on the residual information and the inverse transform unit 230 of the residual processing unit may derive the residual samples for the current block by performing inverse transform for the transform coefficients. S1105 may be performed by the addition unit 235 or a reconstruction unit of the decoding apparatus 200.

Specifically, the decoding apparatus 200 may derive an intra prediction mode/type for the current block based on received prediction information (intra prediction mode/type information) (S1110). The decoding apparatus 200 may derive the neighboring reference samples of the current block (S1120). The decoding apparatus 200 generates prediction samples in the current block based on the intra prediction mode/type and the neighboring reference samples (S1130). In this case, the decoding apparatus 200 may perform a prediction sample filtering procedure. The prediction sample filtering may be called post filtering. Some or all of the prediction samples may be filtered by the prediction sample filtering procedure. In some cases, the prediction sample filtering procedure may be omitted.

The decoding apparatus 200 generates the residual samples for the current block based on the received residual information. The decoding apparatus 200 may generate a reconstructed sample for the current block based on the prediction samples and the residual samples, and derive a reconstructed block including the reconstructed samples (S1140). A reconstructed picture for a current picture may be generated based on the reconstructed block. The in-loop filtering procedure may be further applied to the reconstructed picture as described above.

Here, the intra prediction unit 265 of the decoding apparatus 200 may include an intra prediction mode/type determining unit 266, a reference sample deriving unit 267, and a prediction sample deriving unit 268, and the intra prediction mode/type determining unit 266 may determine the intra prediction mode/type for the current block based on intra prediction mode/type information generated and signaled by the intra prediction mode/type determining unit 186 of the encoding apparatus 100, the reference sample deriving unit 267 may derive the neighboring reference samples of the current block, and the prediction sample deriving unit 267 may derive the prediction samples of the current block. Meanwhile, although not illustrated, when the above-described prediction sample filtering procedure is performed, the intra prediction unit 265 may further include a prediction sample filter unit (not illustrated).

The prediction mode information may include, for example, flag information (e.g., intra_luma_mpm_flag) indicating whether a most probable mode (MPM) is applied to the current block or whether a remaining mode is applied to the current block and when the MPM is applied to the current block, the prediction mode information may further include index information (e.g., intra_luma_mpm_idx) indicating one of the intra prediction mode candidates (MPM candidates). The intra prediction mode candidates (MPM candidates) may be configured as an MPM candidate list or an MPM list. Furthermore, when the MPM is not applied to the current block, the prediction mode information may further include remaining mode information (e.g., intra_luma_mpm_remainder) indicating one of the remaining intra prediction modes other than the intra prediction mode candidates (MPM candidates). The decoding apparatus 200 may determine the intra prediction mode of the current block based on the intra prediction mode information.

Further, the intra prediction type information may be implemented in various forms. As an example, the intra prediction type information may include intra prediction type index information indicating one of intra prediction types. As another example, the intra prediction type information may include at least one of reference sample line information (e.g., intra_luma_ref_idx) indicating whether the MRL is applied to the current block and what place of reference sample line is used when the MRL is applied to the current block, ISP flag information (e.g., intra_subpartitions_mode_flag) indicating whether the ISP is applied to the current block, ISP type information (e.g., intra_subpartitions_split_flag) indicating a partitioning type of sub-partitions when the ISP is applied, flag information indicating whether to apply the PDPC, or flag information indicating whether to apply the LIP.

The intra prediction mode information and/or the intra prediction type information may be encoded/decoded through the coding method described in the present disclosure. For example, intra prediction mode information and/or the intra prediction type information may be encoded or decoded through entropy coding (e.g., CABAC, CAVLC) based on a truncated (rice) binary code.

Determination of Intra Prediction Mode/Type

When the intra prediction is applied, the intra prediction mode to be applied to the current block may be determined using the intra prediction mode of the neighboring block. For example, the decoding apparatus 200 may select one of MPM candidates in an MPM list derived based on an intra prediction mode of a neighboring block (e.g., a left and/or top neighboring block) of the current block and additional candidate modes, based on a received MPM index or select one of the remaining intra prediction modes not included in the MPM candidates based on the remaining intra prediction mode information. For example, whether the intra prediction mode applied to the current block is present in the MPM candidates or the remaining modes may be indicated based on an MPM flag (e.g., intra_luma_mpm_flag). A case where a value of the MPM flag is 1 indicates that the intra prediction mode for the current block is present in the MPM candidates (MPM list) and a case where the value of the MPM flag is 0 may indicate that the intra prediction mode for the current block is not present in the MPM candidates (MPM list). The MPM index may be signaled in a form such as mpm_idx or intra_luma_mpm_idx and the remaining intra prediction mode information may be signaled in a form of a syntax element such as rem_intra_luma_pred_mode or intra_luma_mpm_remainder. For example, the remaining intra prediction mode information may indicate one of the remaining intra prediction modes by indexing the remaining intra prediction modes not included in the MPM candidates among all intra prediction modes, and indicate one thereof. The intra prediction mode may be an intra prediction mode for a luma component (sample). Hereinafter, the intra prediction mode information may include at least one of an MPM flag (e.g., intra_luma_mpm_flag), an MPM index (e.g., mpm_idx or intra_luma_mpm_idx), or remaining intra prediction mode information (e.g., rem_intra_luma_pred_mode or intra_luma_mpm_remainder). In the present disclosure, the MPM list may be referred to as various terms such as an MPM candidate list and candModeList. An intra prediction mode signaling procedure in the encoding apparatus 100 and an intra prediction mode determining procedure in the decoding apparatus 200 may be performed as illustrated in FIGS. 13 and 14.

FIG. 13 illustrates an example of a flowchart for encoding intra prediction information in the process of encoding a video signal according to an embodiment of the present disclosure.

Referring to FIG. 13, an encoding apparatus 100 constitutes an MPM list for a current block (S1310). The MPM list may include candidate intra prediction modes (MPM candidates) which are highly likely to be applied to the current block. The MPM list may include an intra prediction mode of a neighboring block and may further include specific intra prediction modes according to a predetermined method. A specific MPM list constituting method will be described below.

The encoding apparatus 100 determines the intra prediction mode of the current block (S1320). The encoding apparatus 100 may perform prediction based on various intra prediction modes, and determine an optimal intra prediction mode based on rate-distortion optimization (ROD) based thereon. In this case, the encoding apparatus 100 may determine the optimal intra prediction mode by using only the MPM candidates constituted in the MPM list or determine the optimal intra prediction mode by further using the remaining intra prediction modes in addition to the MPM candidates constituted in the MPM list. As a more specific example, if an intra prediction type of the current block is a specific type (e.g., LIP, MRL, or ISP), the encoding apparatus 100 may determine the optimal intra prediction mode by considering only the MPM candidates as intra prediction mode candidates for the current block. That is, in this case, the intra prediction mode for the current block may be determined only in the MPM candidates and encoding/signaling of an MPM flag may not be performed. In this case, a decoding apparatus 200 may infer that the MPM flag is 1 without separately decoding the MPM flag.

Meanwhile, when the intra prediction mode of the current block is one of the MPM candidates in the MPM list, the encoding apparatus 100 generates an MPM index (mpm_idx) indicating one of the MPM candidates. When the intra prediction mode of the current block is not present in the MPM list, the encoding apparatus 100 generates remaining intra prediction mode information indicating a mode such as the intra prediction mode of the current block among the remaining intra prediction modes not included in the MPM list.

The encoding apparatus 100 may encode the intra prediction mode information and output the encoded intra prediction mode information in the form of a bitstream. The intra prediction mode information may include the MPM flag, the MPM index, and/or the remaining intra prediction mode information. Since the MPM index and the remaining intra prediction mode information indicate an intra prediction mode for one block as an alternative relation, the MPM index and the remaining intra prediction mode information are not simultaneously signaled. That is, the MPM flag value of 1 and the MPM index are together signaled or the MPM flag of 0 and the remaining intra prediction mode information are together signaled. However, when a specific intra prediction type is applied to the current block as described above, the MPM flag may not be signaled but only the MPM index may be signaled. That is, in this case, the intra prediction mode information may include only the MPM index.

FIG. 14 illustrates an example of a flowchart for decoding intra prediction information in the process of decoding a video signal according to an embodiment of the present disclosure. The decoding apparatus 200 may determine the intra prediction mode to correspond to the intra prediction mode information determined and signaled by the encoding apparatus 100.

Referring to FIG. 14, the decoding apparatus 200 obtains the intra prediction mode information from the bitstream (S1410). The intra prediction mode information may include at least one of the MPM flag, the MPM index, and the remaining intra prediction mode index as described above.

The decoding apparatus 200 constitutes the MPM list (S1420). The MPM list is constituted equally to the MPM list constituted in the encoding apparatus 100. That is, the MPM list may include an intra prediction mode of a neighboring block and may further include specific intra prediction modes according to a predetermined method. A specific MPM list constituting method will be described below.

Although it is illustrated that step S1420 is performed after step S1410 in FIG. 14, this is just an example, and step S1420 may be performed earlier than or simultaneously with step S1410.

The decoding apparatus 200 determines the intra prediction mode of the current block based on the MPM list and the intra prediction mode information (S1430). As an example, when the value of the MPM flag is 1, the decoding apparatus 200 may derive a candidate indicated by the MPM index among the MPM candidates in the MPM list as the intra prediction mode of the current block. As another example, when the value of the MPM flag is 0, the decoding apparatus 200 may derive an intra prediction mode indicated by the remaining intra prediction information among the remaining intra prediction modes not included in the MPM list as the intra prediction mode of the current block. Meanwhile, as yet another example, if the intra prediction type of the current block is a specific type (e.g., LIP, MRL, or ISP), the decoding apparatus 200 may determine a candidate indicated by the MPM index in the MPM list as the intra prediction mode of the current block without confirming the MPM flag. As such, a specific intra prediction mode deriving procedure is illustrated in FIG. 15. FIG. 15 illustrates an example of a flowchart for determining an intra prediction mode in the process of decoding a video signal according to an embodiment of the present disclosure.

FIG. 16 illustrates an example of 33 directional intra prediction modes according to an embodiment of the present disclosure and 17 illustrates an example of 65 directional intra prediction modes according to an embodiment of the present disclosure.

Meanwhile, the intra prediction mode may include 2 non-directional intra prediction modes and 33 directional intra prediction modes. The non-directional intra prediction modes may include a planar intra prediction mode and a DC intra prediction mode, and the directional intra prediction modes may include intra prediction modes #2 to #34. The planar intra prediction mode may be referred to as the planar mode, and the DC intra prediction mode may be referred to as the DC mode.

Further, in order to capture a random edge direction presented in a natural image, the number of directional intra prediction modes may be extended from legacy 33 to 65 as illustrated in FIG. 17. In this case, the intra prediction mode may include 2 non-directional intra prediction modes and 65 directional intra prediction modes. The extended directional intra prediction modes may be applied to blocks of all sizes, and may be applied to both a luma component and a chroma component.

Furthermore, the intra prediction mode may include 2 non-directional intra prediction modes and 129 directional intra prediction modes. The non-directional intra prediction modes may include a planar intra prediction mode and a DC intra prediction mode, and the directional intra prediction modes may include intra prediction modes #2 to #130.

Meanwhile, the intra prediction mode may further include a cross-component linear model (CCLM) mode for a chroma sample in addition to the above-described intra prediction modes. The CCLM mode may be divided into LT_CCLM, L_CCLM, and T_CCLM according to whether a left sample is considered, whether a top sample is considered, or whether both the left sample and the top sample are considered in order to derive an LM parameter, and may be applied only to the chroma component.

The intra prediction mode may be indexed as shown in Table 1 below, for example.

TABLE 1

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Meanwhile, the intra prediction type (or additional intra prediction mode) may include at least one of the above-described LIP, PDPC, MRL, and ISP. The intra prediction type may be indicated based on the intra prediction type information, and the intra prediction type information may be implemented in various forms. As an example, the intra prediction type information may include intra prediction type index information indicating one of intra prediction types. As another example, the intra prediction type information may include at least one of reference sample line information (e.g., intra_luma_ref_idx) indicating whether the MRL is applied to the current block and what place of reference sample line is used when the MRL is applied to the current block, ISP type information (e.g., intra_subpartitions_split_flag) indicating a partitioning type of sub-partitions when the ISP is applied, flag information indicating whether to apply the PDPC, or flag information indicating whether to apply the LIP.

Constitution of MPM Candidate List

When block partitioning for an image is performed, there is a high possibility that a current block and a neighboring block to be coded will have a similar image characteristic. Therefore, there is a high probability that the current block and the neighboring block have the same or similar intra prediction mode. Accordingly, the encoder may use the intra prediction mode of the neighboring block in order to encode the intra prediction mode of the current block.

For example, the encoder/decoder may constitute the MPM list for the current block. The MPM list may be referred to as the MPM candidate list. Here, MPM may mean a mode used to enhancing coding efficiency by considering a similarity between the current block and the neighboring block when coding the intra prediction mode. In this case, a method for constituting the MPM list including 3 MPM candidates in order to maintain complexity for generating the MPM list to be low may be used. For example, even when 67 intra prediction modes are used, the MPM list may include 3 MPM candidates. When the intra prediction mode for the current block is not included in the MPM list, a remaining mode may be used. In this case, the remaining mode may include 64 remaining candidates and remaining intra prediction mode information indicating one of 64 remaining candidates may be signaled. For example, the remaining intra prediction mode information may include a 6-bit syntax element (e.g., rem_intra_luma_pred_mode).

FIG. 18 illustrates an example of a flowchart constructing a most probable mode (MPM) candidate list according to an embodiment of the present disclosure.

Three types of modes may be considered in order to constitute the MPM list.

Neighbour intra modes
Derived intra modes
Default intra modes

When a neighboring block is intra-coded, an encoder may check or derive a prediction mode of the neighboring block (S1810). For example, the encoder may determine the prediction mode of the current block based on the prediction mode of a left neighboring block and the prediction mode of a top neighboring block, and in this case, the encoder may determine the prediction of the corresponding neighboring block as the MPM. Determining the MPM may be expressed as listing up the MPM candidate (or MPM list).

The encoder checks whether the prediction mode of the left neighboring block and the prediction mode of the top neighboring block are the same as each other (S1820). An initial MPM list may be formed by performing a pruning process for intra prediction modes of two adjacent blocks.

If the prediction mode of the left neighboring block and the prediction mode of the top neighboring block are not the same as each other, a first MPM may be configured to the prediction mode of the left neighboring block, a second MPM may be determined as the prediction mode of the top neighboring block, and a third MPM may be configured to any one of an intra planar mode, an intra DC mode, or an intra vertical mode (intra prediction mode #50) (S1830). Specifically, when the intra prediction modes of two neighboring blocks are different from each other, two intra prediction modes may be configured as the MPM and one of the default intra modes after pruning check by MPMs may be added to the MPM list. Here, the default intra modes may include the intra planar mode, the intra DC mode, and/or the intra vertical mode (intra prediction mode #50). For example, when the prediction mode of the left neighboring block and the prediction mode of the top neighboring block are not the same as each other, the MPM list may be constituted as described below.

If A and B are not the same as each other, if neither A nor B is 0, candModeList [3]={A, B, 0}.

Otherwise (either A or B is 0), if neither A nor B is 1, candModeList [3]={A, B, 1}.

Otherwise (if A, B is 0, 1 or 1, 0), candModeList [3]={A, B, 50}.

Here, A may represent the intra prediction mode of the left neighboring block, B may represent the intra prediction mode of the top neighboring block, 0 may represent the intra planar mode, 1 may represent the intra DC mode, 50 may represent the intra vertical mode, and candModeList may represent the MPM list.

Meanwhile, when the prediction mode of the left neighboring block and the prediction mode of the top neighboring block are the same as each other, the encoder may determine whether the prediction mode of the left neighboring block is smaller than 2 (S1840).

If the prediction mode of the left neighboring block is smaller than 2, a first MPM may be configured to the intra planar mode, a second MPM may be configured to the intra DC mode, and a third MPM may be configured to the intra vertical mode (intra prediction mode #50) (S1850).

Meanwhile, if the prediction mode of the left neighboring block is not smaller than 2, the first MPM may be configured to the prediction mode of the left neighboring block, the second MPM may be configured to (prediction mode of left neighboring block —1), and the third MPM may be configured to (prediction mode of left neighboring block +1) (S1860).

For example, when the prediction mode of the left neighboring block and the prediction mode of the top neighboring block are the same as each other, the MPM list may be constituted as described below.

If two neighboring candidate modes are the same as each other (i.e., if A==B), if A is smaller than 2, candModeList [3]={0, 1, 50}.

Otherwise (if A is equal to or larger than 2), candModeList [3]={A, 2+((A+61) % 64), 2+((A−1) % 64)}.

Here, A may represent the intra prediction mode of the left neighboring block, B may represent the intra prediction mode of the top neighboring block, 0 may represent the intra planar mode, 1 may represent the intra DC mode, 50 may represent the intra vertical mode, and candModeList may represent the MPM list.

Meanwhile, an additional pruning process of removing replication modes may be performed so that only unique modes are included. Further, for entropy coding of 64 non-MPM modes other than 3 MPMs, a 6-bit fixed length code (6-bit FLC) may be used. That is, an index representing 64 non-MPM modes may be entropy-coded with the 6-bit FLC.

In addition, the encoder may determine whether a best intra prediction mode to be applied to the current block belongs to the MPM candidate configured above. If the intra prediction mode of the current block belongs to the MPM candidate, the encoder may encode the MPM flag and the MPM index. Here, the MPM flag may indicate whether the intra prediction mode of the current block is derived from a neighbour intra predicted block (i.e., whether the intra prediction mode of the current block belongs to the MPM). Further, the MPM index may indicate which MPM mode is applied as the intra prediction mode of the current block among the MPM candidates. On the contrary, if the intra prediction mode of the current block does not belong to the MPM candidate, the encoder may encode the intra prediction mode of the current block.

Meanwhile, the encoder/decoder may constitute an MPM list including 6 MPMs. Three types of modes may be considered in order to constitute the MPM list.

Neighbour intra modes

Derived intra modes

Default intra modes

As the neighbour intra modes, two neighbour blocks, i.e., a left neighbour block A and a top neighbour block B may be considered. In order to generate the MPM list including 6 MPMs, an initialized default MPM list below may be considered.

Default 6 MPM modes={A, Planar (0) or DC (1), Vertical (50), HOR (18), VER −4 (46), VER+4 (54)}

Thereafter, a pruning process for two neighboring intra modes is performed to update 6 MPMs. If two neighboring modes are the same as each other and are larger than DC mode 1, 6 MPMs include 3 default modes (A, planar, and DC) and 3 derived modes obtained by adding a predefined offset value to a neighboring mode and by a modular operation. Otherwise, if two neighboring modes are different from each other, two neighboring modes are allocated to 2 MPMs and 4 remaining MPMs are derived from the default modes and the neighboring modes. During a 6-MPM list generation process, pruning for removing the same modes is used so that the unique modes are included in the MPM list. For entropy coding of 61 non-MPM modes, a truncated binary code (TBC) is used.

Derivation of Neighbour Reference Sample

When the intra prediction is applied to the current block as described above, neighbour reference samples to be used for the intra prediction of the current block may be derived. The neighbour reference samples of the current block may include a sample adjacent to a left boundary of the current block having a size of nW×nH and a total of 2×nH samples adjacent to a bottom left side, a sample adjacent to an upper boundary of the current block, and a total of 2×nW adjacent to a top right side, and one sample adjacent to a top left side of the current block. Alternatively, the neighbour reference samples of the current block may include a plurality of columns of upper neighbour samples of a plurality of rows of left neighbour samples.

Some of the neighbour reference samples of the current block may not yet be decoded or may not be available. The decoder may configure neighbour reference samples to be used for the prediction through interpolation of the available samples.

Some of the neighbour reference samples of the current block may not yet be decoded or may not be available. In this case, the decoder may configure the neighbour reference samples to be used for the prediction through extrapolation of the available samples. Until reaching a top right reference sample starting from a bottom left sample, a pixel which is not yet decoded or is not available may be substituted or padded with a latest sample which may be referenced while updating a referenceable sample to a latest sample.

Derivation of Intra Prediction Mode/Type Based Prediction Sample

Multiple Reference Line (MRL) Intra Prediction

In conventional intra prediction, only neighbour samples in a first line on the top of the current block and neighbour samples in a first line on a left side of the current block may be used as the reference samples for the intra prediction. However, according to an MRL method, neighbour samples located on a sample line by a 1 to 3-sample distance in a top and/or left direction of the current block are used as the reference samples, and as a result, the intra prediction may be performed.

FIG. 19 illustrates an example of reference samples considering multi-reference line (MRL) intra prediction according to an embodiment of the present disclosure. FIG. 19 illustrates directly neighboring (closest) reference samples in reference line 0 used for the MRL intra prediction and extended reference samples in reference lines 1 to 3. An MRL index (e.g., mrl_idx) indicates which line is used for the intra prediction with respect to the current block.

For example, the MRL index may be signaled through a coding unit syntax as in Table 2 below. The MRL index may be signaled in a form of a syntax element intra_luma_ref_idx.

TABLE 2

```
coding_unit( x0, y0, cbWidth, cbHeight, treeType ) {
    if( slice_type != I ) {
        cu_skip_flag[ x0 ][ y0 ]
        if( cu_skip_flag[ x0 ][ y0 ] = = 0 )
            pred_mode_flag
    }
    if( CuPredMode[ x0 ][ y0 ] = = MODE_INTRA ) {
        if( treeType = = SINGLE_TREE || treeType = = DUAL_TREE_LUMA ) {
            if( ( y0 % CtbSizeY ) > 0 )
                intra_luma_ref_idx[ x0 ][ y0 ] ...
            if (intra_luma_ref_idx[ x0 ][ y0 ] = = 0)
                intra_luma_mpm_flag[ x0 ][ y0 ]
            if( intra_luma_mpm_flag[ x0 ][ y0 ] )
                intra_luma_mpm_idx[ x0 ][ y0 ]
            else
                intra_luma_mpm_remainder[ x0 ][ y0 ]
        }
        ...
    }
}
``` intra_luma_ref_idx[x0][y0] represents an intra reference line index IntraLumaRefLineIdx[x0][y0] defined as in Table 3 below.

If intra_luma_ref_idx[x0][y0] is not present, a value of intra_luma_ref_idx[x0][y0] is inferred to 0.

intra_luma_ref_idx may be referred to as an (intra) reference sample line index, a reference line index, or mrl_idx. Further, intra_luma_ref_idx may also be referred to as intra_luma_ref_line_idx.

Table 3 below shows a value of IntraLumaRefLineIdx[x0][y0] depending on intra_luma_ref_idx[x0][y0].

TABLE 3

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

If intra_luma_mpm_flag[x0][y0] is not present, a value of intra_luma_mpm_flag[x0][y0]] is inferred to 1.

MRL may be disabled with respect to a block of a first line (row) in a CTU. This is to prevent samples of external extended reference lines of a current CTU line from being used. Further, when the above-described additional reference line is used, the PDPC may be disabled.

Intra Sub-Partition (ISP) Coding Mode

In conventional intra prediction, by regarding a block to be currently encoded as one coding unit, encoding is performed without partitioning. However, in an ISP method, by partitioning the block to be currently encoded in a horizontal direction or a vertical direction, intra prediction encoding is performed. In this case, by performing encoding/decoding in units of the partitioned block, a reconstructed block is generated and the reconstructed block is used as a reference block of a subsequent partitioned block. According to ISP, the block is partitioned as in Table 4 below based on a block size.

TABLE 4

| Block size (CU) | Partitioning number |
|---|---|
| 4 × 4 | Not partitioned |
| 4 × 8, 8 × 4 | 2 |
| All other cases | 4 |

FIGS. 20a and 20b illustrate an example of block partitioning depending on intra sub-partition (ISP) according to an embodiment of the present disclosure.

In the ISP method, in order to reduce encoding complexity, the MPM is generated according to each partitioning method (horizontal partitioning and vertical partitioning), and appropriate prediction modes among prediction modes in a generated MPM list is compared in terms of RDO to determine a best mode. Further, when the above-described MRL intra prediction is used, the ISP may not be used. That is, when a 0-th reference line is used (i.e., when intra_luma_ref_idx is 0), the ISP intra prediction may be applied. Further, when the ISP method is used, the PDPC may not be used.

In the ISP intra prediction method, first, information (e.g., intra_subparitions_mode_flag) indicating whether to apply the ISP is encoded/decoded in units of the block and if the ISP is applied to the current block, information (intra_subpartitions_split_flag) indicating horizontal partitioning or vertical partitioning is encoded/decoded again. Table 5 below shows an example of a syntax structure to which the ISP is reflected.

TABLE 5

```
if( CuPredMode[ x0 ][ y0 ] == MODE_INTRA ) {
    if( pcm_enabled_flag &&
       cbWidth >= MinIpcmCbSizeY && cbWidth <=
MaxIpcmCbSizeY &&
       cbHeight >= MinIpcmCbSizeY && cbHeight <=
MaxIpcmCbSizeY)
       pcm_flag[ x0 ][ y0 ]                                     ae(v)
    if( pcm_flag[ x0 ][ y0 ] ) {
       while( !byte_aligned( ) )
          pcm_alignment_zero_bit                                f(1)
          pcm_sample( cbWidth, cbHeight, treeType)
    } else {
       if( treeType = = SINGLE_TREE | | treeType = =
DUAL_TREE_LUMA ) {
          if( ( y0 % CtbSizeY ) > 0 )
             intra_luma_ref_idx[ x0 ][ y0 ]                     ae(v)
          if (intra_luma_ref_idx[ x0 ][ y0 ] = = 0 &&
             ( cbWidth <= MaxTbSizeY | |
cbHeight <= MaxTbSizeY) &&
             (    cbWidth * cbHeight    >
MinTbSizeY * MinTbSizeY))
                                                                ae(v)
       intra_subpartitions_mode_flag[ x0 ][ y0 ]
          if( intra_subpartitions_mode_flag[ y0 ][ y0 ]
= = 1 &&
             cbWidth <= MaxTbSizeY &&
cbHeight <= MaxTbSizeY )
                                                                ae(v)
       intra_subpartitions_split_flag[ x0 ][ y0 ]
          if (intra_luma_ref_idx[ x0 ][ y0 ] = = 0 &&
intra_subpartitions_mode_flag[ x0 ][ y0 ] = = 0 )
             intra_luma_mpm_flag[ x0 ][ y0 ]                    ae(v)
          if( intra_luma_mpm_flag[ x0 ][ y0 ] )
             intra_luma_mpm_idx[ x0 ][ y0 ]                     ae(v)
          else
                                                                ae(v)
       intra_luma_mpm_remainder[ x0 ][ y0 ]
       }
       if( treeType = = SINGLE_TREE | | treeType = =
DUAL_TREE_CHROMA)
          intra_chroma_pred_mode[ x0 ][ y0 ]                    ae(v)
       }
    } else if( treeType != DUAL_TREE_CHROMA ) {/* MODE_INTER
*/
```

When the ISP intra prediction is applied, the intra prediction mode for the current block is equally applied to respective sub-partitions (subblocks) and neighbour reference samples are derived in units of the sub-partition to enhance an intra prediction capability. That is, when the ISP intra prediction is applied, a residual sample processing procedure is performed in units of the sub-partition. In other words, the intra prediction samples are derived for each sub-partition, and a residual signal (residual samples) for the corresponding sub-partition is added to the intra prediction samples to obtain reconstructed samples. The residual signal (residual samples) may be derived based on a dequantization/inverse transform procedure based on the residual information (quantized transform coefficient information or residual coding syntax) in the bitstream. That is, derivation of prediction samples for a first sub-partition and derivation of the residual samples may be performed, and reconstructed samples for the first sub-partition may be derived based on the derivation of the prediction samples and the derivation of the residual samples. In this case, at the time of deriving prediction samples for a second sub-partition, some (e.g., left or top neighbour reference samples of the second sub-partition) of the reconstructed samples in the first sub-partition may be used as neighbour reference samples for the second sub-partition. Likewise, derivation of prediction samples for the second sub-partition and derivation of the residual samples may be performed, and reconstructed samples for the second sub-partition may be derived based on the derivation of the prediction samples and the derivation of the residual samples. In this case, at the time of deriving prediction samples for a third sub-partition, some (e.g., left or top neighbour reference samples of the third sub-partition) of the reconstructed samples in the first sub-partition may be used as neighbour reference samples for the third sub-partition.

Meanwhile, when the prediction sample of the current block is generated through interpolation of the reference samples, an interpolation filter for interpolation may be derived through various methods. For example, the interpolation filter may be determined based on at least one of the size of the current block and the intra prediction mode applied to the current block. The interpolation filter may include, for example, a Gaussian filter and a cubic filter.

After the intra prediction is performed, a filter (intra boundary filter) for mitigating a block boundary surface may be applied in order to reduce an error between the prediction samples of the current block and a neighboring sample which is already reconstructed. For example, whether to apply the intra boundary filter and a filter type may be determined a predicted mode and the size of the block.

Derivation of Prediction Sample for Chroma Component

When the intra prediction is performed for the current block, prediction for a luma component block (luma block) and prediction for a chroma component block (chroma block) may be performed and in this case, the intra prediction mode for the chroma component (chroma block) may be configured separately from the intra prediction mode for the luma component (luma block).

For example, the intra prediction mode for the chroma component may be indicated based on chroma prediction mode information, the intra chroma prediction mode information may be indicated in a form of a syntax element intra_chroma_pred_mode, and the intra chroma prediction mode information may indicate one of the planar mode, the DC mode, the vertical mode, the horizontal mode, a derived mode (DM), and a CCLM mode. Here, the planar mode may indicate intra prediction mode #0, the DC mode may indicate intra prediction mode #1, the vertical mode may indicate intra prediction mode #26, and the horizontal mode may indicate intra prediction mode #10. The DM may also be referred to as a direct mode. The CCLM may be referred to as an LM.

Meanwhile, the DM and the LM are dependent intra prediction modes to predict the chroma block using information on the luma block. The DM may indicate a mode in which the intra prediction mode which is the same as the intra prediction mode for the luma component is applied to the intra prediction mode for the chroma component. Furthermore, the CCLM may indicate an intra prediction mode using, as the prediction samples of the chroma block, samples derived by applying CCLM parameters α and β to subsampled samples after subsampling the reconstructed samples of the luma block during a process of generating the prediction block for the chroma block.

Multiple Direct Modes for Chroma Intra Coding

FIG. 21 is a diagram for describing multiple direct modes (DMs) for intra prediction of a chroma block according to an embodiment of the present disclosure.

Multiple direct modes (MDMs) may be applied to a current chroma block. In the multiple direct modes, the DM mode which is the existing single mode is extended to a plurality of modes, which is used. That is, a plurality of DM modes may be selected as below at the time of configuring the intra prediction mode of a chroma image.

Intra prediction mode of CR, TL, TR, BL, and BR (see FIG. 21) of a luma block at the same location Intra prediction mode of L, A, BL, AR, and AL blocks which are neighbour blocks of a current chroma block PLANAR and DC modes Angular mode selected above −1 or +1 angular mode Vertical and Horizontal modes, and modes #2, #34, #66, #10, and #26 (in case of 65-direction mode)

When 5 prediction modes are not selected, the mode selected above is copied and selected.

Cross-Component Linear Model

A CCLM mode may be applied to the current chroma block. The CCLM mode is an intra prediction mode using a correlation between the luma block and the chroma block corresponding to the luma block. According to the CCLM mode, a linear model may be derived based on neighbour samples of the luma block and neighbour samples of the chroma block, and prediction samples of the chroma block may be derived based on the linear model, and reconstructed samples of the luma block. More specifically, when the CCLM mode is applied to the current chroma block, parameters for the linear model may be derived based on the neighbour samples used for the intra prediction of the current chroma block and the neighbour samples used for the intra prediction of the current luma block. For example, the linear model may be expressed based on Equation 1 below.

$$pred_c(i,j) = \alpha \cdot rec_L'(i,j) + \beta \qquad \text{[Equation 1]}$$

Here, $pred_c(i,j)$ represents a prediction sample of a coordinate (i,j) of the current chroma block and $recL'(i,j)$ represents a reconstructed sample of a coordinate (i,j) of the current luma block. Further, $recL'(i,j)$ may represent a downsampled reconstructed sample of the current luma block.

FIG. 22 illustrates an example of a sample location for deriving parameters of a cross-component linear model (CCLM) mode for intra prediction of a chroma block according to an embodiment of the present disclosure.

Meanwhile, parameters α and β of the linear model may be derived based on the neighbour samples used for the intra prediction of the current luma block and the neighbour samples used for the intra prediction of the current chroma block. The parameters α and β may be derived based on Equations 2 and 3 below.

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)} \qquad \text{[Equation 2]}$$

$$\beta = \frac{\sum C(n) - \alpha \cdot \sum L(n)}{N} \qquad \text{[Equation 3]}$$

Here, L(n) may represent top neighbour samples and/or left neighbour samples of the current luma block and C(n) may represent top neighbour samples and left neighbour samples of the current chroma block. Furthermore, the L(n) may represent downsampled top neighbour samples and/or left neighbour samples of the current luma block. Furthermore, N may represent a value twice larger than a smaller value of the width and the height of the current chroma block.

Meanwhile, a total of intra prediction modes may be permitted in order to code the chroma intra prediction mode. 8 intra prediction modes may include 5 existing intra prediction modes, and a CCML mode(s). Table 6 below shows a mapping table for deriving the intra chroma prediction mode when the CCLM is not disabled (when sps_cclm_enabled_flag is 0), and Table 7 shows a mapping table for deriving the intra prediction mode when the CCLM is enabled (when sps_cclm_enabled_flag is 1). As shown in Tables 7 and 8, the intra chroma prediction mode may be determined based on a an intra luma prediction mode for a luma block (e.g., a case where DUAL_TREE is applied) covering a center bottom right sample of the current block or the chroma block and a value of signaled intra chroma prediction mode (intra_chroma_pred_mode) information. Indices of IntraPredModeC[xCb][yCb] derived in Tables 7 and 8 may correspond to indices of the intra prediction modes in Table 1.

TABLE 6

| intra_chroma_pred_mode[ xCb ][ yCb ] | IntraPredModeY[ xCb + cbWidth/2 ][ yCb + cbHeight/2 ] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 7

| intra_chroma_pred_mode[ xCb ][ yCb ] | IntraPredModeY[ xCb + cbWidth/2 ][ yCb + cbHeight/2 ] | | | | |
|---|---|---|---|---|---|
| | 0 | 50 | 18 | 1 | X ( 0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |

EMBODIMENTS

An embodiment of the present disclosure relates to intra prediction, and particularly, to an intra prediction mode/type determining method and an MPM candidate list constituting method. A syntax structure in Table 8 below indicates a method for obtaining the intra prediction mode by using intra classification information.

TABLE 8

```
if (!intra_luma_ref_idx)
    intra_luma_angular_mode_flag
    if (!intra_luma_angular_mode_flag)
        intra_luma_planar_flag // Planar if true, DC otherwise
if (intra_luma_ref_idx || intra_luma_angular_mode_flag)
    if (intra_luma_ref_idx)
        intra_luma_mpm_flag=1
    else
        intra_luma_mpm_flag
    if (intra_luma_mpm_flag)
        intra_luma_mpm_idx
    else
        intra_luma_mpm_remainder
```

In the case of a method for obtaining the intra prediction mode according to Table 8, the decoder first checks a multiple reference line index (intra_luma_ref_idx), and when the multiple reference line index is 0, the decoder decodes a directional mode flag (intra_luma_angular_mode_flag) to check whether a current mode is a directional mode. Here, the directional mode is a remaining mode other than the planar mode and the DC mode. If the current mode is not the directional mode (i.e., if the current mode is the planar mode or the DC mode), the decoder decodes a planar flag (intra_luma_planar_flag) to determine the current mode among the planar mode and the DC mode. If the current mode is the directional mode, the decoder decodes an MPM flag (intra_luma_mpm_flag), and decodes an MPM index (intra_luma_mpm_idx) and the remaining index (intra_luma_mpm_remainder) conditionally according to the MPM flag.

In the intra prediction mode determining method according to Table 8, the planar mode and the DC mode are distinguished as separate prediction modes, and separated from the directional mode and encoded/decoded to combine an MPM mode list generating method for general intra mode encoding and multiple reference line encoding as one method.

An embodiment of the present disclosure provides a method for configuring an intra classification flag by additionally considering ISP intra prediction in addition to general intra prediction and multiple reference line intra prediction, and unifying the MPM list according to the configured intra classification flag. An intra prediction encoding/decoding structure may be simplified through the proposed method, and intra prediction encoding efficiency may be increased.

Embodiment 1

The embodiment provides a method for classifying an intra mode by using a dominant mode flag or a dominant flag and generating 6 MPM lists by using a method for generating a unified MPM list. The dominant mode flag may be included in the above-described intra prediction mode information (intra prediction information), the dominant mode flag may be referred as another name such as the planar flag, and may be simply referred to as flag information.

FIG. 23 illustrates an example of a flowchart for encoding/decoding intra prediction information by using a primary mode flag according to an embodiment of the present disclosure.

In an intra encoding process, the MRL intra prediction does not use the planar mode and the DC mode, and the ISP intra prediction does not use the DC mode.

Further, in the method according to the embodiment, the dominant mode flag may be used in order to distinguish the non-directional mode (planar mode and the DC mode).

Referring to FIG. 23, the decoder checks whether MRL intra prediction is used based on a reference line index (or reference sample location information) (ref_idx) (S2310). If the MRL intra prediction is not used for the current block (ref_idx=0) (i.e., when reference samples positioned in a line adjacent to the current block are used), the decoder checks whether the ISP intra prediction is used (S2320). If the ISP intra prediction is not used for the current block (ISP=no split), the decoder checks the dominant mode flag (dominant flag) (S2330). If the dominant mode flag is 1, the decoder checks whether the prediction mode of the current block is the planar mode or the DC mode (S2340), and determines the prediction mode as the planar mode (S2350) or determines the prediction mode as the DC mode (S2355). Here, the decoder may determine the prediction mode of the current block according to whether the prediction mode is the planar mode (e.g., if the planar flag is 1) or whether the prediction mode is the DC mode (e.g., if the planar flag is 0) by using separate information (e.g., planar flag (second flag)). If the MRL intra prediction is not used for the current block (ref_idx=0), the ISP prediction is not also used (ISP=no split), and the dominant mode flag is also 0, the decoder determines the intra prediction mode among the MPM candidate mode or the remaining candidate modes (S2365). The decoder may determine the intra prediction mode by using prediction mode indication information (e.g., the MPM index or the remaining index).

If the MRL intra prediction is not applied to the current block (ref_idx=0), but the ISP intra prediction is applied (ISP !=no split), the decoder checks the dominant mode flag (S2345). If the dominant flag is 1 when the ISP intra prediction is applied, the planar ode is determined as the intra prediction mode (S2360) and if not, the decoder determines the intra prediction mode among the MPM candidate mode or the remaining candidate modes (S2365).

If the MRL intra prediction is applied to the current block (i.e., if reference samples positioned spaced apart from the current block by a 2-sample distance or more are used), the decoder determines the intra prediction mode among the MPM candidate mode or the remaining candidate modes through an intra mode paring process (S2365).

According to the method proposed in the embodiment, since the planar mode and the DC mode are not used in the case of the MRL intra prediction, if the ISP intra prediction is used for the current block, it is checked whether to apply the planar mode through the dominant mode flag and if the planar mode is not applied, the intra prediction mode is determined among the MPM candidate mode or the remaining candidate modes through the intra mode parsing process. Since all intra prediction modes may be used in the case of the intra prediction in which the MRL and the ISP are not used, the decoder may determine the intra prediction mode among the planar mode, the DC mode, and the directional intra prediction modes through the dominant mode flag (dominant flag) (first flag) and the planar flag (second flag).

Since the planar mode and the DC mode are separately encoded/decoded by using the dominant mode flag (dominant flag) in the method proposed in Embodiment 1, the encoder/decoder may constitute 6 MPM lists by using the directional mode except for the non-directional mode (the planar mode and the DC mode) at the time of constituting 6 MPM lists. A separate flag indicating whether to use a primarily used specific mode is used to reduce a data amount for transmission of the intra prediction mode and a processing time of information of the intra prediction.

Embodiment 2

The embodiment provides a method for classifying the intra prediction mode by using the dominant mode flag and generating an MPM list having a reduced number (e.g., 4) by using the method for generating the unified MPM list. In particular, the embodiment provides a method for constituting the MPM list by using 4 MPM candidates instead of 6 MPM candidates.

FIG. 24 illustrates an example of a case of generating an MPM list according to an embodiment of the present disclosure.

In the method according to the embodiment, an MPM list is generated, which has 4 MPM candidates by excluding the planar mode and the DC mode from 6 MPM lists (or an MPM list including 6 MPM candidates improved through various improvement methods) used in legacy intra prediction. Since the encoder/decoder separately encodes/decodes the planar mode and the DC mode by using the dominant mode flag, the planar mode and the DC mode need not be considered in the process of intra mode encoding/decoding. Accordingly, the encoder/decoder generates the MPM list having 4 MPM candidates instead of the MPM list having 6 MPM candidates, and performs the intra mode encoding/decoding by using the generated MPM list.

Since the encoder/decoder separately encodes/decodes the planar mode and the DC mode by using the dominant mode flag (dominant flag) as illustrated in FIG. 24, the encoder/decoder generates the MPM list having 6 MPM candidates like the related art, and then removes the planar mode and the DC mode and rearranges the MPM candidates in the MPM list to finally the MPM list having 4 MPM candidates.

Embodiment 3

The embodiment provides a method for enabling the DC mode to be used at the time of the MRL intra prediction, and generating the unified MPM list by classifying the intra prediction mode by considering that the DC mode is enabled to be used.

FIG. 25 illustrates another example of a flowchart for encoding/decoding intra prediction information according to an embodiment of the present disclosure.

In legacy intra encoding, the MRL intra prediction does not use the planar mode and the DC mode, and the ISP intra prediction does not use the DC mode. According to the method proposed in the embodiment, it is considered that the DC mode may be used even in the MRL intra prediction. Accordingly, as illustrated in FIG. 25, first, the decoder checks whether to use the MRL intra prediction (S2510), and if the MRL intra prediction is not used for the current block (ref_idx=0), the decoder checks whether to use the ISP intra prediction (S2520). If the ISP intra prediction is not applied to the current block (ISP=no split), the decoder checks the dominant mode flag (dominant flag) (S2530). If a predefined specific prediction mode is used (if the dominant mode flag is 1), the decoder checks whether the prediction mode of the current block is the planar mode or the DC mode (S2540), and determines the prediction mode as the planar mode (S2550) or determines the prediction mode as the DC mode (S2555). Here, the decoder may determine the prediction mode of the current block according to whether the prediction mode is the planar mode (e.g., if the planar flag is 1) or whether the prediction mode is the DC mode (e.g., if the planar flag is 0) by using separate information (e.g., planar flag). If the MRL intra prediction is not used for the current block (ref_idx=0), the ISP intra prediction is not used (ISP=no split), and the predefined specific prediction mode is not used (if the dominant mode flag is 0), the decoder determines the intra prediction mode among the MPM candidate mode or the remaining candidate modes (S2575).

If the MRL intra prediction is not used for the current block (ref_idx=0), but the ISP intra prediction is used (ISP !=no split), the decoder checks the dominant mode flag (dominant flag) (S2545). If a predefined specific mode is used (if the dominant mode flag is 1) when the ISP intra prediction is used, the planar mode is determined as the intra prediction mode of the current block (S2560) and if not (if the dominant mode flag is 0), the decoder determines the intra prediction mode among the MPM candidate mode or the remaining candidate modes through the intra mode parsing process (S2575).

If the MRL intra prediction is not used for the current block (ref_idx !=0), the decoder checks the dominant mode flag (dominant flag). According to the embodiment, the DC mode may be used in the MRL intra prediction and the decoder may check whether to use the DC mode based on the dominant mode flag (S2525). If the predefined specific mode is used for the current block in which the MRL intra prediction is used (if the dominant mode flag is 1), the DC mode is determined as the prediction mode of the current block (S2570). If not (if the predefined specific mode is not used), the decoder determines the intra prediction mode among the MPM candidate mode or the remaining candidate modes through the intra mode parsing process (S2575).

According to the method proposed in the embodiment, since the planar mode is not used in the case of the MRL intra prediction and the DC mode is not used in the case of the ISP intra prediction, when the MRL intra prediction or the ISP intra prediction is used, the decoder checks whether to apply each of the DC mode and the planar mode by using the dominant mode flag. If the dominant mode flag is not used for the legacy intra prediction, the MRL intra prediction, and the ISP intra prediction, the legacy intra mode encoding/decoding process may be performed.

Since the encoder/decoder separately encodes/decodes the planar mode and the DC mode by using the dominant mode flag (dominant flag) according to the method proposed in the embodiment, the encoder/decoder may constitute the MPM list having 6 MPM candidates by using only the directional mode other than the planar mode and the DC mode when constituting the MPM list having 6 MPM candidates. In this case, a method for constituting the MPM list having 6 MPM candidates in a state of excluding the planar mode and the DC mode may be variously configured.

Embodiment 4

The embodiment provides a method for classifying the intra mode by using the dominant mode flag and generating an MPM list having 4 MPM candidates while using the method for generating the unified MPM list. The embodiment provides a method for constituting the MPM list by combining an embodiment (Embodiment 3) of adding the DC mode to the MRL intra prediction proposed in Embodiment 3 and an embodiment (Embodiment 2) of constituting 4 MPM lists.

Embodiment 5

According to the embodiment, the planar mode and the DC mode are configured to be usable in the MRL intra prediction and the DC mode is configured to be usable in the ISP intra prediction. The embodiment provides a method for classifying the intra mode by using the dominant mode flag and generating an MPM list having 6 MPM candidates while through the method for generating the unified MPM list.

FIG. 26 illustrates yet another example of a flowchart for encoding/decoding intra prediction information by using a primary mode flag according to an embodiment of the present disclosure.

According to the embodiment, since all intra prediction modes may be used in the legacy intra prediction, the MRL intra prediction, and the ISP intra prediction, the decoder determines the prediction mode of the current block among the planar mode, the DC mode, and the directional mode by using the dominant mode flag (dominant flag) as illustrated in FIG. 26. The decoder checks whether the predefined specific mode is used by using the dominant mode flag (dominant flag) (S2610). If a predefined specific prediction mode is used (if the dominant mode flag is 1), the decoder checks whether the prediction mode of the current block is the planar mode or the DC mode (S2620), and determines the prediction mode as the planar mode (S2630) or determines the prediction mode as the DC mode (S2635). Here, the decoder may determine the prediction mode of the current block according to whether the prediction mode is the planar mode (e.g., if the planar flag is 1) or whether the prediction mode is the DC mode (e.g., if the planar flag is 0) by using separate information (e.g., planar flag). If the predefined specific prediction mode is not used (if the dominant mode flag is 0), the decoder determines the intra prediction mode among the MPM candidate mode or the remaining candidate modes through the intra mode parsing process (S2640).

According to the embodiment, the encoder/decoder separately encodes/decodes the planar mode or the DC mode by using the dominant mode flag (dominant flag). Therefore, at the time of constituting the MPM list, the encoder/decoder constitutes the MPM list by using only the directional mode in a state of excluding the planar mode and the DC mode. In this case, the number of MPM candidates for constituting the MPM list may be randomly determined. That is, the number of MPM candidates constituting the MPM list may be configured to a random number (N).

Further, the above-described dominant mode flag (dominant flag) may be used for indicating one specific mode (e.g., planar mode). In this case, the dominant mode flag may be referred to as the planar flag. For example, the decoder checks whether to use the planar mode by parsing the planar flag, and when the planar flag is 0, the decoder may determine the planar flag as the intra prediction mode of the current block and when the planar flag is 1, the decoder may determine one of the MPM candidates (other than the planar mode) as the intra prediction mode of the current block by parsing the MPM index.

Bitstream

Based on the embodiments of the present disclosure described above, the encoded information (e.g., encoded video/image information) derived by the encoding apparatus 100 may be output in the form of the bitstream. The encoded information may be transmitted or stored in units of a network abstraction layer (NAS) in the form of the bitstream. The bitstream may be transmitted via a network or stored in a non-transitory digital storage medium. Further, the bitstream is not directly transmitted from the encoding apparatus 100 to the decoding apparatus 200 as described above, but may be subjected to a streaming/download service through an external server (e.g., content streaming server). Here, the network may include a broadcasting network and/or a communication network and the digital storage medium may include various storage media including USB, SD, CD, DVD, Blu-ray, HDD, SSD, and the like.

FIG. 27 illustrates an example of a flowchart for intra prediction in the process of encoding a video signal according to an embodiment of the present disclosure. Operations of FIG. 27 may be performed by the encoding apparatus 100 or the video signal processing device 500. More specifically, the operations of FIG. 27 may be performed by the intra prediction unit 185 (the intra prediction mode/type determining unit 186 of FIG. 10) in the encoding apparatus 100, and performed by the processor 510 of the video signal processing device 500. Further, step S2710 of FIG. 27 may correspond to an example of step S910 of FIG. 9, and step S2720 of FIG. 27 may correspond to an example of step S930 of FIG. 9.

In step S2710, the encoder determines the intra prediction mode of the current block. The intra prediction mode means a technique for deriving the prediction sample of the current block from one or more reference samples positioned in the neighbour to the current block. For example, the intra prediction mode may include a non-directional mode such as a scheme (DC mode) of deriving the prediction sample by using a mean of neighbour reference samples or a scheme (planar mode) of deriving the prediction sample by using a weighted sum of a left reference sample and a top reference sample of a specific sample, and a directional mode to use (copy) a reference sample positioned in a specific direction based on a sample location in the current block. For example, the intra prediction mode may be configured like 35 intra modes including 2 non-directional modes and 33 directional modes as illustrated in FIG. 16 or 67 intra modes including 2 non-directional modes and 65 directional modes as illustrated in FIG. 17.

Further, the encoder selects a reference sample line having the highest prediction accuracy among multiple reference sample lines located in a neighbour to the current block to derive the prediction sample by using a reference sample located in a prediction direction in the corresponding line, and in this case, the encoder may perform intra prediction encoding by a method for indicating (signaling) the used reference sample line to the decoder. Such an intra prediction scheme may be referred to as the MRL intra prediction.

As described in Embodiment 1, when the MRL intra prediction is applied, the planar mode and the DC mode may not be used. However, even when the MRL intra prediction is applied as in Embodiment 3, the DC mode may be used or even when the MRL intra prediction is applied as in Embodiment 5, all intra prediction modes including the DC mode and the planar mode may be used. Further, when the MRL intra prediction is applied, only the MPM candidate mode included in the MPM list may be used (i.e., coding of the MPM flag may be omitted and a value of the MPM flag may be inferred to 1.).

Further, the encoder may perform the intra prediction based on the same intra prediction mode by dividing the current block into vertical or horizontal sub-partitions, but derive and use neighbour reference samples in units of the sub-partition. That is, in this case, the intra prediction mode for the current block is equally applied to the sub-partitions, but the neighboring reference sample is derived and used in units of the sub-partition to enhance an intra prediction capability in some cases. Such a prediction method may be referred to as the ISP intra prediction.

As described in Embodiment 1, when the ISP intra prediction is applied, the DC mode may not be used. However, even when the ISP intra prediction is applied as in Embodiment 5, all intra prediction modes including the DC mode and the planar mode may be used.

In step S2720, the encoder generates intra prediction information based on the intra prediction mode. According to the embodiment of the present disclosure, the encoder may encode a corresponding prediction mode apart from another mode with respect to a predefined specific prediction mode (e.g., the planar mode or the DC mode). Thereafter, a separately coded prediction mode is referred to as a first mode.

That is, the intra prediction information generated by the encoder includes a first flag (e.g., the dominant mode flag (dominant flag)) for indicating a predetermined first mode. Here, the first flag may be coded to a first value (e.g., 0) when the intra prediction mode corresponds to a first mode (e.g., the planar mode or the DC mode) and coded to a second value (e.g., 1) when the intra prediction mode corresponds to one of modes other than the first mode.

In an embodiment, the first mode corresponds to the non-directional mode, and the non-directional mode includes at least one of the planar mode and the DC mode. That is, when the intra prediction mode corresponds to the non-directional mode (the planar mode and the DC mode), the encoder may omit generation of the MPM candidate and coding of the MPM index (mpm_idx) or coding of a remaining index (remainder_idx) indicating one of the remaining modes other than the MPM candidate, and indicate the planar mode or the DC mode by using only the first flag.

In an embodiment, when the first flag corresponds to a first value (e.g., 0), the intra prediction information may further include a second flag (planar flag) indicating one of the planar mode and the DC mode. For example, when the first (non-directional mode) is applied while the MRL intra prediction and the ISP intra prediction are not used as in Embodiment 1 (ref_idx=0, ISP=no split), the encoder codes the planar flag as an additional syntax element. For example, when the DC mode is used among the modes corresponding to the first mode, the encoder may code the planar flag to 0 and when the planar mode is used, the encoder may code the planar flag to 1.

In an embodiment, the encoder configures an MPM candidate list including MPM candidates when the intra prediction mode corresponds to one of the modes other than the first mode, and here, the MPM candidate list is configured based on intra prediction modes other than the first mode among all modes. Thereafter, the encoder may code the MPM index indicating one of the MPM candidates in the MPM candidate list when the intra prediction mode corresponds to one of the MPM candidates and code the remaining index indicating one of the remaining candidates other than the first mode and the MPM candidates among all modes as the intra prediction information.

FIG. 28 illustrates an example of a flowchart for intra prediction in the process of decoding a video signal according to an embodiment of the present disclosure. Operations of FIG. 28 may be performed by the decoding apparatus 200 or the video signal processing device 500. More specifically, the operations of FIG. 28 may be performed by the intra prediction unit 265 (the intra prediction mode/type determining unit 266 of FIG. 10) in the decoding apparatus 200, and performed by the processor 510 of the video signal processing device 500. Further, steps S2810 to S2820 in FIG. 28 may correspond to an example of step S1110 in FIG. 11, and step S2830 in FIG. 28 may correspond to an example of step S1130 in FIG. 11.

In step S2810, the decoder obtains the intra prediction information of the current block to which the intra prediction is applied. Here, the intra prediction information includes a first flag (e.g., the dominant mode flag (dominant flag)) indicating a predetermined first mode. In an embodiment, the first mode may correspond to a non-directional mode, and the non-directional mode may include at least one of a planar mode or a DC mode. That is, the first mode may correspond to the planar mode or the DC mode, and the first flag may be a syntax element indicating one of the planar mode or the DC mode.

In an embodiment, when the first flag corresponds to a first value (e.g., 0), the decoder may obtain a second flag (planar flag) indicating whether to use the planar mode. In this case, the intra prediction mode of the current block may be determined as one of the planar mode and the DC mode based on the second flag. For example, when the second flag is 0, the DC mode may be determined as the intra prediction mode and when the second flag is 1, the planar mode may be determined as the intra prediction mode.

In an embodiment, when the first flag corresponds to the first value (e.g., 0) and the current block is not partitioned by the ISP, the second flag may be parsed. Further, when the first flag corresponds to the first value (e.g., 0) and the current block is partitioned by the ISP, the intra prediction mode may be determined as the planar mode. For example, as described in Embodiment 1, since the DC mode is not used when the ISP intra prediction is used (i.e., when the current block is partitioned by the ISP), the decoder may determine the planar mode as the intra prediction mode if the first flag corresponds to the first value (e.g., 0). On the contrary, since both the DC mode and the planar mode may be used when the ISP intra prediction is not used (i.e., when the current block is not partitioned by the ISP), the decoder may additionally parse the second flag when the first flag corresponds to the first value (e.g., 0), and determine one of the DC mode or the planar mode as the intra prediction mode according to the second flag.

In an embodiment, the decoder may obtain a reference index (e.g., ref_idx) indicating a location of a reference sample for prediction of the current block. When reference samples positioned spaced apart from the current block by a 2-sample distance or more are used (e.g., ref_idx>0), the decoder may obtain the first flag and when the first flag corresponds to the first value (e.g., 0), the intra prediction mode of the current block may be determined as the DC mode. That is, as described in Embodiment 3, by considering that the DC mode may be used even when the ISP intra prediction is used (ref_idx>0), the decoder may parse the first flag, and determine the DC mode as the intra prediction mode if the first flag corresponds to the first value (e.g., 0).

Moreover, by considering that both the DC mode and the planar mode may be used even when the ISP intra prediction and the MRL intra prediction are applied as described in Embodiment 5, the first flag may be parsed regardless of the reference index (ref_idx) and ISP partitioning, and the second flag (planar flag) may be additionally parsed.

In an embodiment, the decoder obtains information (e.g., reference index, MRL index, or ref_idx) on the location of the reference sample for prediction of the current block. When reference samples positioned in a line adjacent to the current block are used (e.g., when ref_idx=0), the decoder obtains the first flag and when the reference samples positioned spaced apart from the current block by the 2-sample distance or more are used (e.g., when ref_idx>0) (that is, when the MRL intra prediction is used), the decoder obtains prediction mode indication information. Here, the prediction mode indication information may include the MPM index indicating one of the MPM candidate modes or a remaining index indicating one of the remaining candidates other than the first mode and the MPM candidate modes among all modes. As described in Embodiment 1, since the DC mode and the planar mode are not used when the MRL intra prediction is used, the decoder may omit parsing of the first flag and parse one of the MPM index or the remaining index. For example, the decoder determines whether to use the MPM candidate modes based on the MPM flag, and the decoder obtains the MPM index when the MPM candidate modes are used and obtains the remaining index when the MPM candidate modes are not used. That is, the decoder may parse the MPM index (e.g., when the MPM flag is 1) or the remaining index (e.g., when the MPM flag is 0) according to the MPM flag indicating whether to use the MPM candidate.

In step S2820, the decoder determines the intra prediction mode of the current block based on the intra prediction information. Here, when the first flag corresponds to the first value (e.g., 0), the first mode is determined as the intra prediction mode and when the first flag corresponds to the second value (e.g., 1), one of a plurality of candidate modes is determined as the intra prediction mode.

In an embodiment, when the first flag corresponds to the second value (e.g., 1), the decoder may constitute the MPM candidate list including the MPM candidate modes. Here, the MPM candidate list may be constituted based on intra prediction modes other than the first mode among the all modes. Since the prediction mode (the planar mode or the DC mode) corresponding to the first mode is excluded as described in Embodiments 2 and 4, the MPM candidate list may have a reduced number (e.g., 4).

In step S2830, the decoder generates a prediction sample of the current block based on the intra prediction mode and a reference sample in a current picture.

The processing methods to which the present disclosure is applied may be manufactured in the form of a program executed by a computer and may be stored in computer-readable recording media. Multimedia data with a data structure according to the present disclosure may also be stored in computer-readable recording media. The computer-readable recording media include all types of storage devices and distributed storage devices in which data readable by a computer is stored. The computer-readable recording media may include a Blue-ray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bitstream generated by the encoding method may be stored in a computer-readable recording medium or may be transmitted over wired/wireless communication networks.

Embodiments of the present disclosure can be implemented as computer program products by program codes, and the program codes can be executed in a computer according to embodiments of the present disclosure. The program codes may be stored on computer-readable carriers.

A non-transitory computer-readable medium according to an embodiment of the present disclosure stores one or more instructions executed by one or more processors. The one or more instructions determines the intra prediction mode of the current block for encoding of a video signal, and controls the video signal processing device 500 (encoding apparatus 100) so as to generate the intra prediction information based on the intra prediction mode. Here, the intra prediction information includes a first flag (dominant mode flag), and the first flag is coded to the first value when the intra prediction mode corresponds to a predetermined first mode and coded to the second value when the intra prediction mode corresponds to one of the modes other than the first mode.

In an embodiment, the first mode may correspond to a non-directional mode, and the non-directional mode may include at least one of a planar mode or a DC mode.

In an embodiment, when the first flag corresponds to the first value, the intra prediction information may further include a second flag (planar flag) indicating one of the planar mode and the DC mode.

In an embodiment, in the process of generating the intra prediction information, the instructions may control the video signal processing device 500 (or encoding apparatus 100) to constitute an MPM candidate list including MPM candidates when the intra prediction mode corresponds to one of the modes other than the first mode, and here, the MPM candidate list is constituted based on intra prediction modes other than the first mode among all modes, and code an MPM index indicating one of the MPM candidates in the MPM candidate list as the intra prediction information when the intra prediction mode corresponds to one of the MPM candidates and code a remaining index indicating one of remaining candidates other than the first mode and the MPM candidates among the all modes as the intra prediction information when the intra prediction mode is not included in the MPM candidate list.

For decoding the video signal, the instructions according the embodiment of the present disclosure are configured to obtain intra prediction information of a current block to which intra prediction is applied, here, the intra prediction information includes a first flag (dominant mode flag) indicating a predetermined first mode, determine the intra prediction mode of the current block based on the intra prediction information, and here, when the first flag corresponds to a first value, the first mode is determined as the intra prediction mode and when the first flag corresponds to a second value, one of a plurality of candidate modes is determined as the intra prediction mode, and generate a prediction sample of the current block based on the intra prediction mode and a reference sample in a current picture.

In an embodiment, the first mode may correspond to a non-directional mode, and the non-directional mode may include at least one of a planar mode or a DC mode.

In an embodiment, the instructions may control the video signal processing device 500 (or encoding apparatus 100) to obtain a second flag (planar flag) indicating whether to use a planar mode in the process of obtaining intra prediction information. Here, the intra prediction mode of the current block may be determined as one of the planar mode and the DC mode based on the second flag.

In an embodiment, the second flag may be parsed when the first flag corresponds to the first value and the current block is not partitioned by intra sub-partition (ISP).

In an embodiment, when the first flag corresponds to the first value and the current block is partitioned by the intra sub-partition (ISP), the intra prediction mode may be determined as the planar mode.

In an embodiment, the instructions may control the video signal processing device 500 (encoding apparatus 100) to obtain information on a location of a reference sample for prediction of the current block, obtain the first flag when reference samples positioned in a line adjacent to the current block are used, and obtain prediction mode information when references positioned spaced apart from the current block by a 2-sample distance or more are used, in the process of obtain intra prediction information. Here, the prediction mode indication information may include an MPM index indicating one of most probable mode (MPM) candidate modes or a remaining index indicating one of remaining candidates other than the first mode and the MPM candidate modes.

In an embodiment, the instructions may control the video signal processing device 500 (encoding apparatus 100) to determine whether to use the MPM candidate modes based on an MPM flag, and obtain the MPM index when the MPM candidate modes are used and obtain the remaining index when the MPM candidate modes are not used.

In an embodiment, the instructions may control the video signal processing device 500 (encoding apparatus 100) to constitute an MPM candidate list including MPM candidate modes when the first flag corresponds to the second value, in the process of determining the intra prediction mode. Here, the MPM candidate list may be constituted based on intra prediction modes other than the first mode among the all modes.

In an embodiment, the instructions may control the video signal processing device 500 (encoding apparatus 100) to obtain a reference index indicating a location of a reference sample for prediction of the current block, and obtain the first flag when reference samples positioned spaced apart from the current block by a 2-sample distance or more are used, in the process of obtain intra prediction information. Here, when the first flag corresponds to the first value, the intra prediction mode of the current block may be determined as the DC mode.

As described above, embodiments of the present disclosure can be implemented and executed on a processor, a microprocessor, a controller or a chip. For example, functional units shown in each figure can be implemented and executed on a computer, a processor, a microprocessor, a controller or a chip.

The decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VoD) service providing apparatuses, over the top video (OTT) video systems, Internet streaming service providing apparatuses, 3D video systems, video phone video systems, medical video systems, etc., and may be used to process video signals or data signals. For example, OTT video systems may include game consoles, Blue-ray players, Internet access TVs, home theater systems, smartphones, tablet PCs, digital video recorders (DVRs), etc.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although exemplary embodiments of the present disclosure have been described for illustrative purposes, those skilled in the art will appreciate that various modifications, additions and substitutions are possible, without departing from the technical spirit and the technical scope of the present disclosure.

The invention claimed is:

1. A method for decoding a video signal, the method comprising:
    obtaining reference sample line information of a current block from the video signal, wherein reference sample line information represents an index indicating reference sample line being used for the intra prediction;
    obtaining an intra sub-partition(ISP) flag representing whether the current block is partitioned into sub-partitions based on the reference sample line information;
    obtaining intra prediction information of the current block to which the intra prediction is applied based on the reference sample line information, wherein the intra prediction information includes a first flag representing whether an intra prediction mode is not a planar mode;
    determining the intra prediction mode of the current block based on the intra prediction information, wherein based on the first flag corresponds to 0, the planar mode is determined as the intra prediction mode and based on the first flag corresponds to 1, one of a plurality of candidate modes is determined as the intra prediction mode;
    deriving prediction samples of the current block based on the intra prediction mode and reference samples;
    obtaining residual information of the current block from the video signal;
    deriving residual samples of the current block based on the residual information; and
    reconstructing the current block based on the prediction samples and residual samples.

2. The method of claim 1, further comprising obtaining an ISP type flag representing whether an ISP type is horizontal or vertical based on the current block is partitioned into sub-partitions.

3. The method of claim 1, wherein the first flag is obtained based on the reference sample line information corresponds to reference samples positioned on a line adjacent to the current block.

4. The method of claim 1, further comprising
    determining whether to use most probable mode (MPM) candidate modes based on a MPM flag;
    obtaining a MPM index if the MPM candidate modes are used; and
    obtaining a remaining index if the MPM candidate modes are not used.

5. The method of claim 4, wherein the MPM index is obtained based on reference samples positioned spaced apart from the current block by a 2-sample distance or more are used.

6. The method of claim 1, wherein the determining of the intra prediction mode includes
    configuring an MPM candidate list including the MPM candidate modes when the first flag corresponds to 1, and
    wherein the MPM candidate list is configured based on intra prediction modes other than the planar mode among the all modes.

7. A method for encoding a video signal, the method comprising:
    determining reference sample line being used for the intra prediction;
    generating reference sample line information of a current block, wherein reference sample line information represents an index indicating reference sample line being used for the intra prediction;
    determining an intra prediction mode of the current block;
    generating intra prediction information based on the intra prediction mode;
    generating an intra sub-partition(ISP) flag representing whether the current block is partitioned into sub-partitions based on the reference sample line information;
    generating prediction samples of the current block based on the intra prediction mode and reference samples;
    generating residual samples of the current block based on the prediction samples; and
    performing a transform, quantization and entropy-encoding the residual samples,
    wherein the intra prediction information includes a first flag representing whether the intra prediction mode is not a planar mode, and
    wherein the first flag is coded with 0 based on the intra prediction mode corresponds to the planar mode and coded with 1 based on the intra prediction mode corresponds to one of modes other than the planar mode.

8. A non-transitory computer-readable storage medium storing video information generated by performing the steps of:
    determining reference sample line being used for the intra prediction;
    generating reference sample line information of a current block, wherein reference sample line information represents an index indicating reference sample line being used for the intra prediction;
    determining an intra prediction mode of the current block;
    generating intra prediction information based on the intra prediction mode;
    generating an intra sub-partition(ISP) flag representing whether the current block is partitioned into sub-partitions based on the reference sample line information;

generating prediction samples of the current block based on the intra prediction mode and reference samples;

generating residual samples of the current block based on the prediction samples; and performing a transform, quantization and entropy-encoding the residual samples, wherein the intra prediction information includes a first flag representing whether the intra prediction mode is not a planar mode, and wherein the first flag is coded with 0 based on the intra prediction mode corresponds to the planar mode and coded with 1 based on the intra prediction mode corresponds to one of modes other than the planar mode.

* * * * *